US007963327B1

(12) United States Patent
Saleri et al.

(10) Patent No.: US 7,963,327 B1
(45) Date of Patent: Jun. 21, 2011

(54) METHOD FOR DYNAMICALLY ASSESSING PETROLEUM RESERVOIR COMPETENCY AND INCREASING PRODUCTION AND RECOVERY THROUGH ASYMMETRIC ANALYSIS OF PERFORMANCE METRICS

(75) Inventors: Nansen G. Saleri, Houston, TX (US); Robert M. Toronyi, Houston, TX (US)

(73) Assignee: QRI Group, LLC, Houston, TX (US)

( * ) Notice: Subject to any disclaimer, the term of this patent is extended or adjusted under 35 U.S.C. 154(b) by 164 days.

(21) Appl. No.: 12/392,891

(22) Filed: Feb. 25, 2009

Related U.S. Application Data

(60) Provisional application No. 61/031,167, filed on Feb. 25, 2008, provisional application No. 61/101,008, filed on Sep. 29, 2008, provisional application No. 61/101,024, filed on Sep. 29, 2008, provisional application No. 61/154,503, filed on Feb. 23, 2009.

(51) Int. Cl.
*E21B 47/00* (2006.01)
*G01V 3/18* (2006.01)
(52) U.S. Cl. .................. 166/252.1; 166/268; 702/9
(58) Field of Classification Search ............... 166/252.1, 166/268; 702/6, 9, 10; 703/10
See application file for complete search history.

(56) References Cited

U.S. PATENT DOCUMENTS

| 3,035,440 | A * | 5/1962 | Reed .................... 73/152.41 |
| 2002/0013687 | A1* | 1/2002 | Ortoleva .................... 703/10 |
| 2002/0120429 | A1* | 8/2002 | Ortoleva .................... 703/2 |
| 2005/0149307 | A1* | 7/2005 | Gurpinar et al. ........... 703/10 |
| 2005/0209912 | A1* | 9/2005 | Veeningen et al. ........... 705/11 |
| 2009/0133871 | A1* | 5/2009 | Skinner et al. ........... 166/250.16 |
| 2010/0082142 | A1* | 4/2010 | Usadi et al. .................... 700/104 |

OTHER PUBLICATIONS

Saleri et al., "Engineering Control in Reservoir Simulation: Parts I and II", SPE 18305, 1988.
Saleri et al., "Data and Data Hierarchy", SPE 21369, pp. 1286-1293, Dec. 1992.
Saleri, "Reservoir Performance Forecasting: Acceleration by Parallel Planning", JPT, pp. 652-657, Jul. 1993.
Saleri, "'Learning' Reservoirs: Adapting to Disruptive Technologies", JPT, pp. 57-60, Mar. 2002.
Saleri et al., "The Expanding Role of the Drill Bit in Shaping the Subsurface", JPT, pp. 53-58, Dec. 2003.
Saleri et al., "Shaybah-220: A Maximum-Reservoir-Contact (MRC) Well and Its Implications for Developing Tight-Facies Reservoirs", SPE Reservoir Evaluation & Engineering, pp. 316-320, Aug. 2004.
Saleri, "Reservoir Management Tenets: Why They Matter to Sustainable Supplies", JPT, pp. 28-30, Jan. 2005.

(Continued)

*Primary Examiner* — David J Bagnell
*Assistant Examiner* — Catherine Loikith
(74) *Attorney, Agent, or Firm* — Workman Nydegger

(57) ABSTRACT

Methods for accurately assessing the condition of a petroleum reservoir and designing and implementing a plan of action to increase production and recovery of petroleum from the reservoir. Information is gathered using a unique set of metrics and information gathering techniques and analyzed in a targeted fashion by properly weighting the data in the context of the particular reservoir and goals of the producer. A reservoir rating is generated using asymmetric analysis of metrics and then used to formulate a plan of action. Production architecture (e.g., number, location and manner of constructing oil and injector wells) is then constructed according to the plan of action. Reservoir performance can be continuously monitored and used to verify production and recovery goals and/or provide triggers or alarms to alter production equipment.

35 Claims, 20 Drawing Sheets

OTHER PUBLICATIONS

Saleri, "Tenets and Diagnostics in Modern Reservoir Management", 8th International Forum on Reservoir Simulation, Jun. 2005, Stressa, Italy.

Saleri, "The Next Trillion: Anticipating and Enabling Game-Changing Recoveries", JPT, Apr. 2006.

Saleri, "Haradh III: A Milestone for Smart Fields", JPT, Nov. 2006.

Saleri, "Dawn in the Desert: Saudi High Tech Paying Off at Ghawar", Energy Tribune, pp. 15-17, Sep. 2007.

Helman, "The Octopus", Forbes Energy & Genius, pp. 44-51, Nov. 24, 2008.

* cited by examiner

400
METHOD FOR DYNAMICALLY ASSESSING PETROLEUM RESERVOIR COMPETENCY AND INCREASING PRODUCTION AND RECOVERY THROUGH ASYMMETRIC ANALYSIS OF PERFORMANCE METRICS

CROSS REFERENCE TO RELATED APPLICATIONS

This application claims the benefit of the following: U.S. Provisional Application No. 61/031,167, filed Feb. 25, 2008, and entitled "METHOD FOR DYNAMICALLY ASSESSING PETROLEUM RESERVOIR COMPETENCY THROUGH ASYMMETRIC ANALYSIS OF PERFORMANCE METRICS"; U.S. Provisional Application No. 61/101,008, filed Sep. 29, 2008, and entitled "ASSESSING PETROLEUM RESERVOIR RESERVES AND POTENTIAL FOR INCREASE"; U.S. Provisional Application No. 61/101,024, filed Sep. 29, 2008, and entitled "ASSESSING PETROLEUM RESERVOIR PRODUCTION RATE THROUGH PRODUCTION GAIN INDEX"; and U.S. Provisional Application No. 61/154,503, filed Feb. 23, 2009, and entitled "METHOD OF ASSESSING THE QUALITY OF RESERVOIR MANAGEMENT". The disclosures of the foregoing applications are incorporated herein in their entirety.

BACKGROUND OF THE INVENTION

1. The Field of the Invention

The invention is in the field of petroleum recovery, more particularly in the field of petroleum reservoir design, management and response.

2. The Relevant Technology

Petroleum is a critical fuel source and is the life blood of modern society. There is tremendous economic opportunity in finding and extracting petroleum. Due to a variety of technical and geological obstacles, it is typically impossible to recover all of the petroleum contained in a reservoir.

Until 1965, typical petroleum reservoir recovery rates were approximately 25%. That is, this is the fraction of petroleum within a reservoir that could be economically and/or feasibly extracted. The remaining 75% remaining essentially unrecoverable due to technological and/or economic impediment. Since then, with advancing technologies and increasing economic incentive due to higher crude oil prices, the average recovery rate has increased to about 35%. While that represents a significant increase in average total recovery, it also means that about 65% of the petroleum found in a typical reservoir remains unrecoverable from an economic and/or technical standpoint.

Given the high cost of exploration, dwindling opportunities to find new petroleum reservoirs, and the rising cost of petroleum as a commodity, there currently exists a tremendous economic opportunity to significantly increase both short-term and long-term production of a petroleum reservoir. The fact that a majority of petroleum in a typical reservoir remains unrecoverable in spite of the high marginal economic benefits of increasing recovery means that there do not currently exist technologically and/or economically predictable ways of increasing recovery.

While the technology may, in fact, exist to increase current production and/or increase total long-term recovery for a petroleum reservoir, an impediment to implementing an intelligent long-term plan for maximizing current output, extending the life of a given reservoir, and increasing total recovery is the inability to accurately assess the health and deficiencies of the reservoir. For example, some or all of the producing wells of a reservoir may show diminishing output, which might lead some to believe the reservoir is drying up. However, the reservoir may, in fact, contain much larger quantities of recoverable petroleum but be under-producing simply due to poor placement and/or management of the existing wells and the failure to know whether and where to place new wells. The inability to properly diagnose inefficiencies and failures and implement an intelligent recovery plan can result in diminished short-term productivity and long-term recovery.

In general, those who operate production facilities typically focus on oil well maintenance and may even implement the latest technologies for maximizing well output. They fail, however, to understand the total picture of health and longevity of the reservoir, which may be serviced by several wells. Wells are difficult and expensive to drill and operate. Once a given number of wells are in place, it may be economically infeasible to drill more wells in order to increase reservoir production (i.e., the marginal cost may exceed the marginal benefit). Moreover, there may be no apparent reason to shut down a producing well even though doing so might actually increase short-term production and improve long-term recovery. The knowledge of when and why to shut down or alter a producing well and/or properly construct a new well often eludes even the most experienced producers and well managers. The failure to properly manage existing wells and/or place and construct new wells can increase capital costs while reducing production and recovery.

The main impediment to maximizing production and recovery from a reservoir is the inability to gather, intelligently analyze and correctly understand the relevant data. Diagnosing the health of a petroleum reservoir is not straightforward and is much like trying to decipher the health of a human body, but at a location far beneath the earth or ocean. Moreover, the available data may take years to accumulate and assess, yet may be dynamically changing, making it difficult, if not impossible, to formulate and implement an economically and/or technically feasible plan of action. The result is continuing low short-term productivity and low long-term recovery from the petroleum reservoir.

BRIEF SUMMARY OF THE INVENTION

The present invention seeks to overcome existing technical, economic and institutional impediments that reduce production and recovery from a petroleum reservoir by more accurately assessing the actual condition of an existing reservoir and implementing an intelligent plan of action in order to increase short-term production rates and long-term recovery of petroleum from the reservoir. It does so by gathering information using a unique set of metrics and information gathering techniques and analyzing the gathered information in a targeted fashion by properly weighting the data in the context of the particular reservoir in question and the goals of the producer.

All hydrocarbon assets carry an individual "DNA" reflective of their subsurface and surface features. However, conventional methods do not provide useful tools for properly understanding the unique features and needs of each particular petroleum reservoir. The disclosed method provides an enabling tool for developing and applying extraction methods which are optimally designed to the specifications of each individual petroleum reservoir. Its success in arriving at optimal solutions derives from its ability to filter out non-critical parameters and identify the specific reasons for reservoir underperformance. It assists in incrementally increasing both production and reserves over and above levels being achieved using standard industry techniques.

The method integrates a wide variety of information using specific metrics. Some are known while others are unique to the inventive process. The metrics include both leading and lagging indicators of petroleum reservoir productivity. While producers typically focus on lagging indicators, such as declining production and/or increasing water-cut, the present invention makes substantial use of leading indicators that are more predictive of future prouction declines or other problems before they occur. That permits the formulation and implementation of a plan of action before the reservoir health declines too far. An analogy is preventative versus curative health care. The latter attempts to find a remedy for a sick patient while the former seeks to prevent the patient from getting sick. Lagging indicators may, however, be a good tool to ensure accountability.

Relevant information regarding reservoir condition is gathered in a far more broad-based and comprehensive manner compared to conventional techniques. The invention implements an intensely focused and demanding information gathering process in order to obtain and comprehensively analyze all available information that may be relevant to the reservoir condition. All known sources of relevant information may be tapped during an intensive information gathering period.

The invention analyzes the gathered information and accurately assesses the condition of a given reservoir by appropriately weighting the various data points. The process of weighting different data points with greater or lesser emphasis is referred to "asymmetric assessment". There are certain metrics, typically the leading indicators, which are more useful than others (e.g., lagging indicators) in realistically assessing the present and future condition of a petroleum reservoir. Moreover, the manner in which certain metrics are weighted may depend on the particular reservoir in question and/or the specific performance goals of the producer.

A plan of action is formulated based on the properly gathered, analyzed and weighted data for a particular reservoir. The plan of action may require modest or substantial changes in how extraction of petroleum is carried out for that reservoir. Regardless, because the plan of action is based on an accurate assessment of the short-, mid- and long-term condition of the reservoir and is tailored to the specific conditions of the reservoir and/or needs of the producer, the plan of action is far more likely to succeed and result in increased short-, mid- and/or long-term production and profits compared to what is possible using conventional methods.

A plan of action is implemented in order to increase short-term production and/or long-term recovery (e.g., proven reserves). The plan of action may include one or more of the following: (1) modifying and/or stimulating one or more existing wells, (2) constructing new wells, (3) injection of pressurized fluids and/or gas in a more intelligent and strategic manner, and (4) shutting or slowing down production by one or more existing wells. In general, it is beneficial to (1) maximize contact between the well bore and reservoir, (2) reduce gas-to-oil ratios and/or water cuts and/or draw-down pressures among adjacent and/or similarly situated and/or similarly designed wells, and (3) optimize extraction rates to more closely correspond to surrounding pore displacement efficiencies and well-bore replenishment locations." When the producing wells of a reservoir are operating in an optimized manner, short-term production is increased and long-term recovery is maximized.

Finally, the petroleum reservoir may be monitored to ensure compliance with design and production goals, e.g., as set by RCAA™. Alarms or trigger points may be provided which, when exceeded such as by falling below a specified minimum or exceeding a specified maximum, call for a response. The response may be a notification to a manager or other interested party, or it may be an automatic adjustment to some production parameter.

The inventive reservoir competency asymmetric assessment methods of the invention have the ability to increase short-, mid- and long-term productivity and recovery by about 5-40%. In some cases, the inventive methods will permit economically and technically viable extraction of a majority of a reservoir's known capacity, up to about 80-85% in some cases. This is a surprising and unexpected result given the tremendous untapped economic potential that currently exists but has been unable to spur production of even a majority of known reservoir capacity given all that is currently known about petroleum reservoir maintenance and extraction.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

I. Introduction

The present invention is directed toward a comprehensive method for enhancing ongoing production and ultimate recovery of petroleum from a reservoir. This method may be referred to as Reservoir Competency Asymmetric Assessment™ (or RCAA™). RCAA™ includes several closely interrelated sub-methods or modules that are employed in concert and sequentially. They are (i) analyzing and diagnosing the specific and unique features of a reservoir (i.e., its "DNA") using targeted metrics, (ii) designing a plan of action for maximizing current production and ultimate recovery from the reservoir, (iii) implementing the plan of action so as to increase current production and ultimate recovery, and (iv) monitoring or tracking the performance of the petroleum reservoir using targeted metrics and making adjustments to production parameters, as necessary, to maintain desired productivity and recovery.

Each of the sub-methods relies on intense knowledge gathering techniques, which include taking direct measurements of the physics, geology, and other unique conditions and aspects of the reservoir and, where applicable, considering the type, number, location and efficacy of any wells that are servicing, or otherwise associated with, the reservoir (e.g., producing wells, dead wells, and observation wells), analyzing the present condition or state of the reservoir using asymmetric weighting of different metrics, and prognosticating future production, recovery and other variables based on a comprehensive understanding of the specific reservoir DNA coupled with the asymmetric weighting and analysis of the data. In some cases, the gathered information may relate to measurements and data generated by others.

II. Information Gathering and Metrics

A. Overview

In general, RCAA™ is an assessment process which guides both the planning and implementation phases of petroleum recovery. All hydrocarbon assets carry an individual "DNA" reflective of their subsurface and surface features. RCAA™ is an enabling tool for developing and applying extraction methods which are optimally designed to the specifications of individual hydrocarbon reservoirs. Its main value is assisting in the realization of incremental barrels of reserves and production over and above levels being achieved using standard industry techniques. This, in turn, may reduce long-term capital and operating expenses.

Figure 1A:
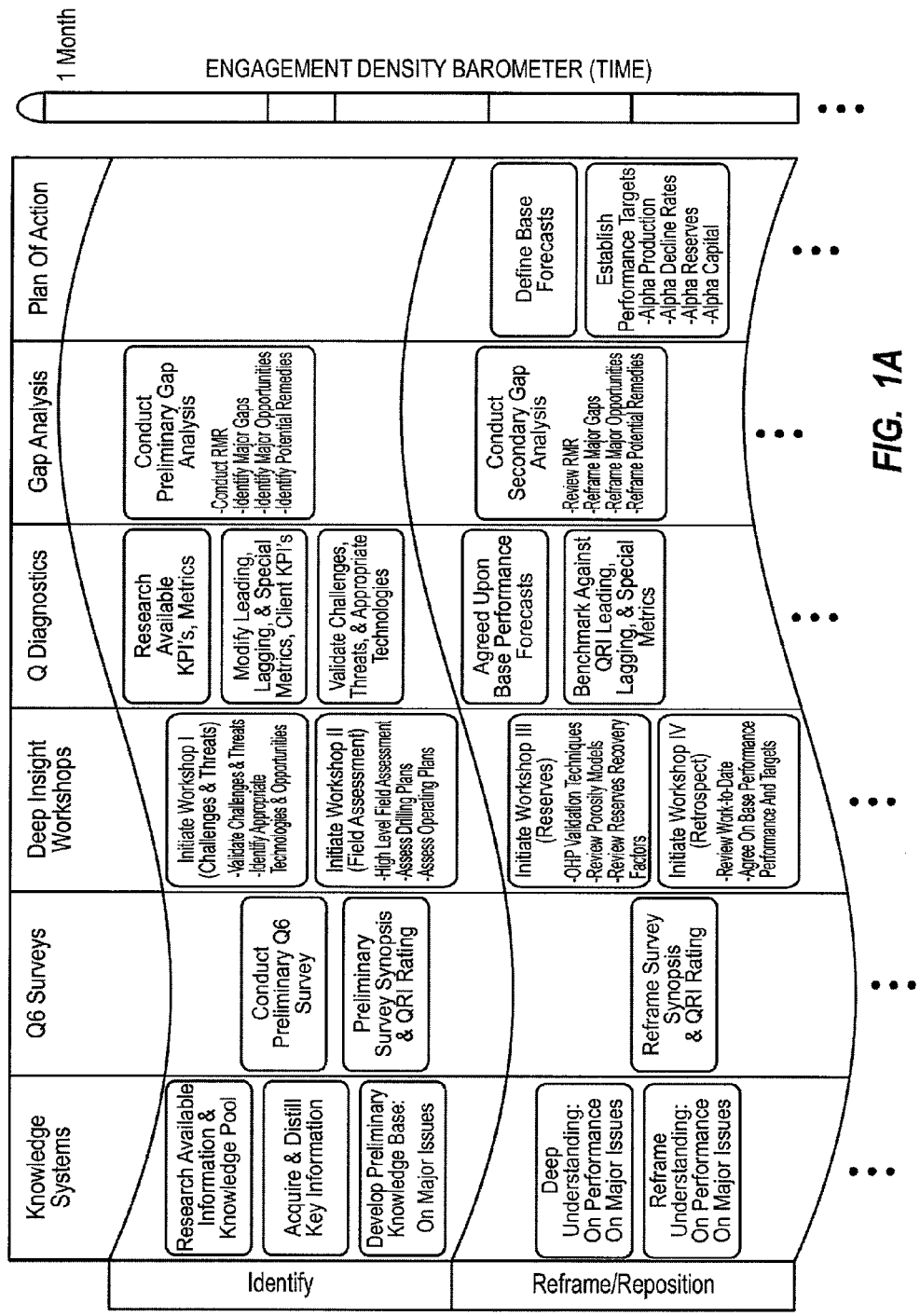
FIGS. 1A and 1B are two halves of a chart which illustrates an exemplary master plan for implementing one method for dynamically assessing petroleum reservoir competency and increasing production and recovery through asymmetric analysis of performance metrics.
Figure 1B:
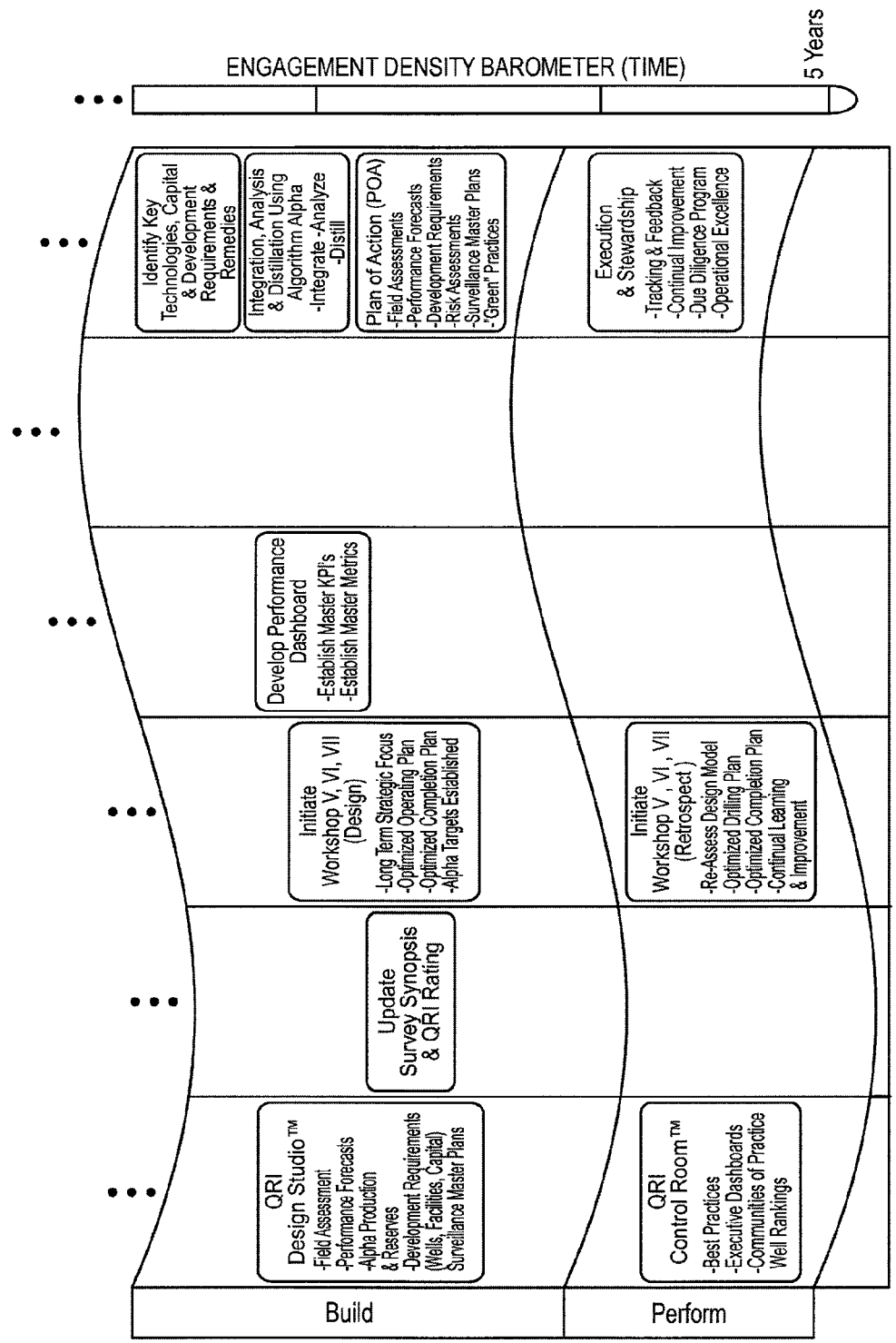

According to one embodiment, implementation of RCAA™ spans six interweaving and interdependent tracks: i) Knowledge Systems; ii) Q6 Surveys; iii) Deep Insight Workshops; iv) Q-Diagnostics; v) Gap Analysis; and vi) Plan of Action. The information gathered from these tracks is integrated using modern knowledge-sharing mediums including web-based systems and communities of practice. A comprehensive chart showing the conceptual and temporal interrelation of the six tracks is illustrated in FIGS. 1A and 1B (i.e., two halves of one chart). While the overall business model includes both technological and non-technological means for gathering the relevant information, the method cannot be implemented without the use of physical processes and machinery for gathering key information. Moreover, implementing a plan of action involves computerized monitoring of well activity. And enhanced reservoir performance results in a physical transformation of the reservoir itself.

Figure 2:
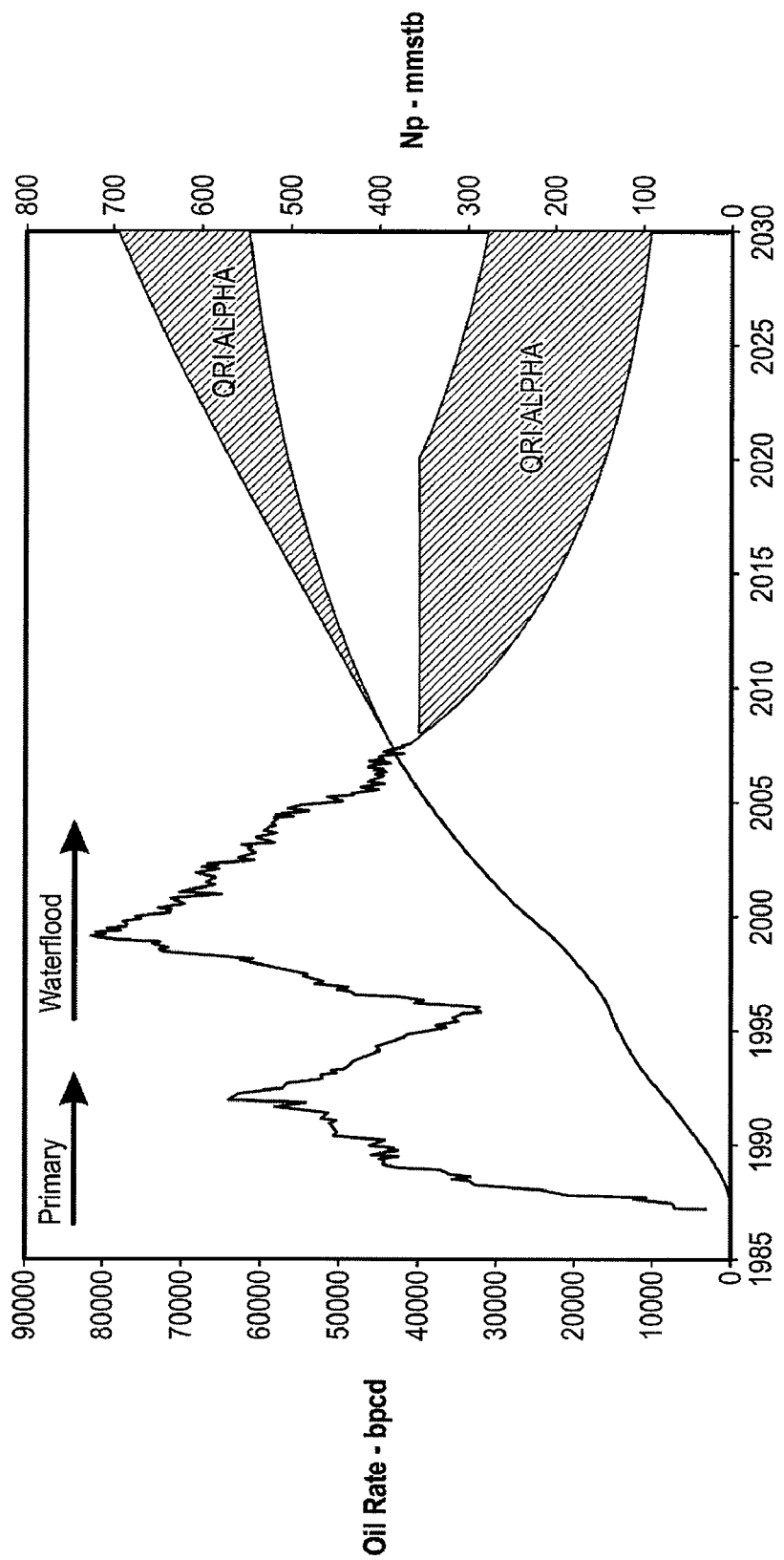
FIG. 2 is an exemplary graph that illustrates the difference between production and recovery of a reservoir before and after implementation of the inventive methods.
Figure 3A:
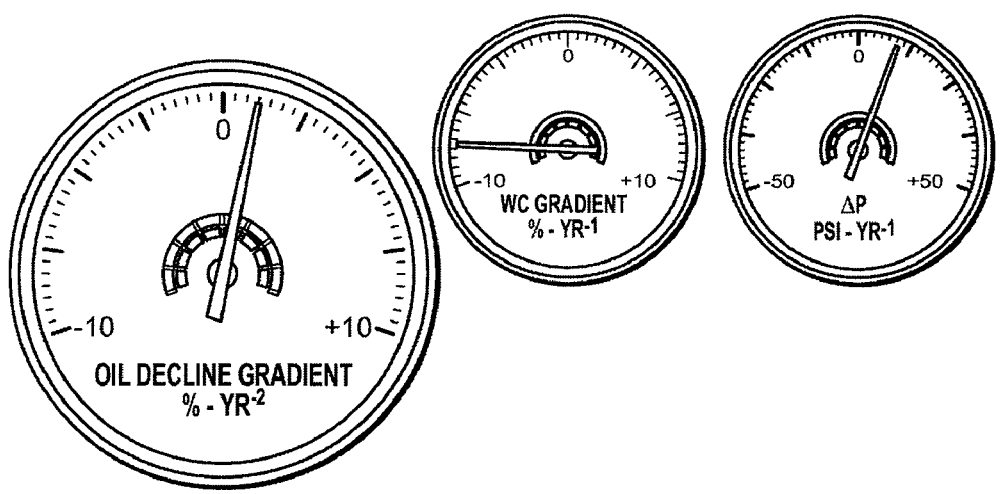
FIGS. 3A-3D illustrate exemplary dashboards within a computer generated and displayed control room that monitors and analyzes data from producing wells of a petroleum reservoir.
Figure 3B:
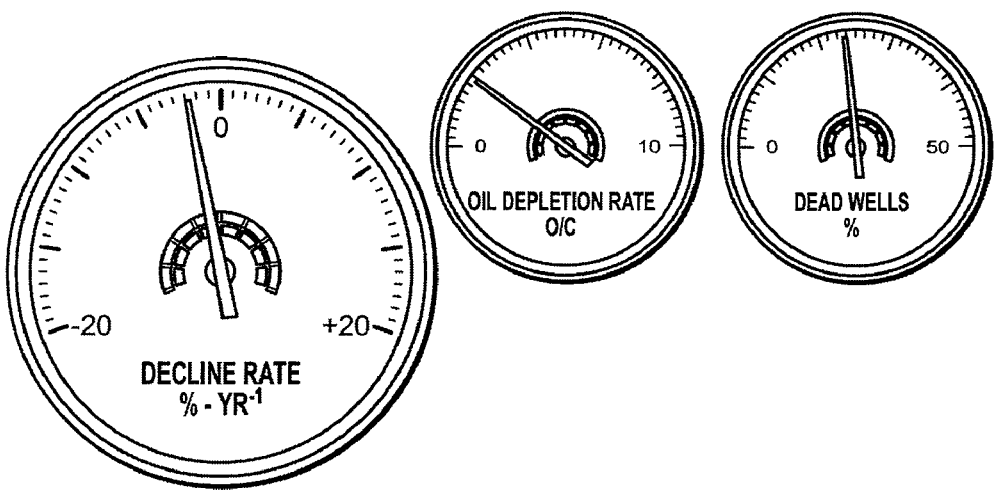
Figure 3C:
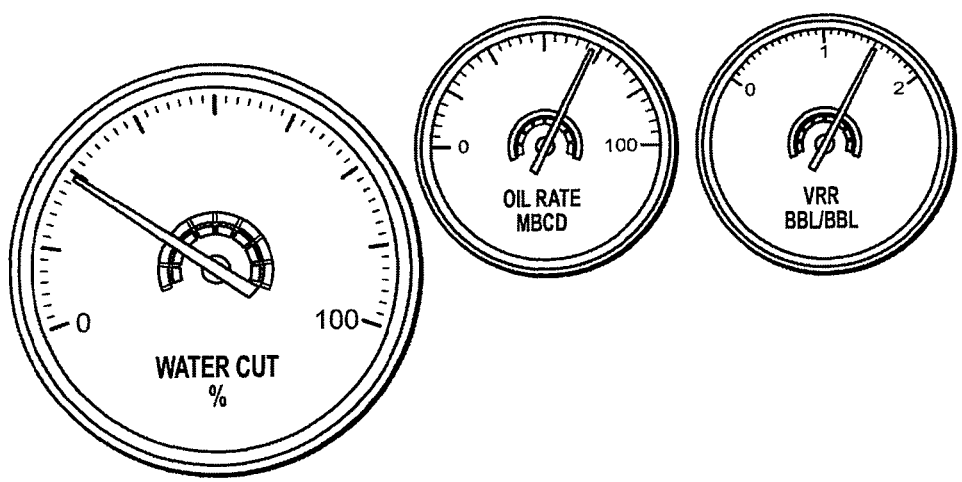
Figure 3D:
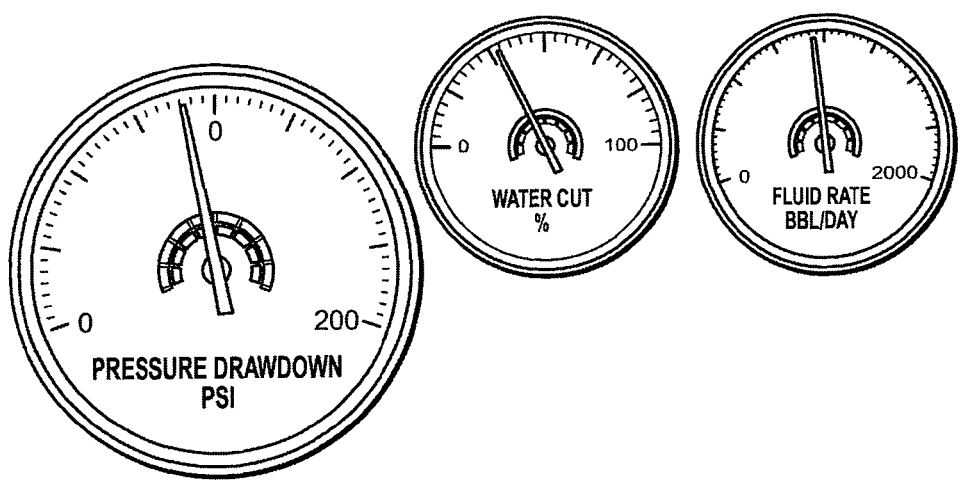

Physical processes that utilize machinery to gather data include, for example, 1) coring to obtain down hole rock samples (both conventional and special coring), 2) taking down hole fluid samples of oil, water and gas, 3) measuring initial pressures from repeat formation tester (RTF) or like devices, and 4) determining fluid saturations from well logs (both cased hole and open hole). Moreover, once a plan of action is implemented and production and/or recovery from the reservoir are increased, the reservoir is transformed from a lower-producing to a higher-producing asset. FIG. 2 illustrates how the inventive process physically transforms the petroleum reservoir and/or recovery system by increasing current production and overall long-term recovery.

Monitoring the performance of the reservoir before, during and/or after implementation of a plan of action involves the use of a computerized system (i.e., part of the "control room") that receives, analyzes and displays relevant data (e.g., to and/or between one or more computers networked together and/or interconnected by the internet). Examples of metrics that can be monitored include 1) reservoir pressure and fluid saturations and changes with logging devices, 2) well productivity and drawdown with logging devices, fluid profile in production and injection wells with logging devices, and oil, gas and water production and injection rates. Relevant metrics can be displayed on the internet. Web based systems can share such data. FIGS. 3A-3D illustrate exemplary "dashboards" that can be used to graphically display certain metrics (e.g., leading and lagging) compiled from ongoing data sampling of producing wells. The dashboards can provide a quick visual diagnostic tool to assess past and future performances.

B. Computerized Information Gathering and Analysis

Figure 4:
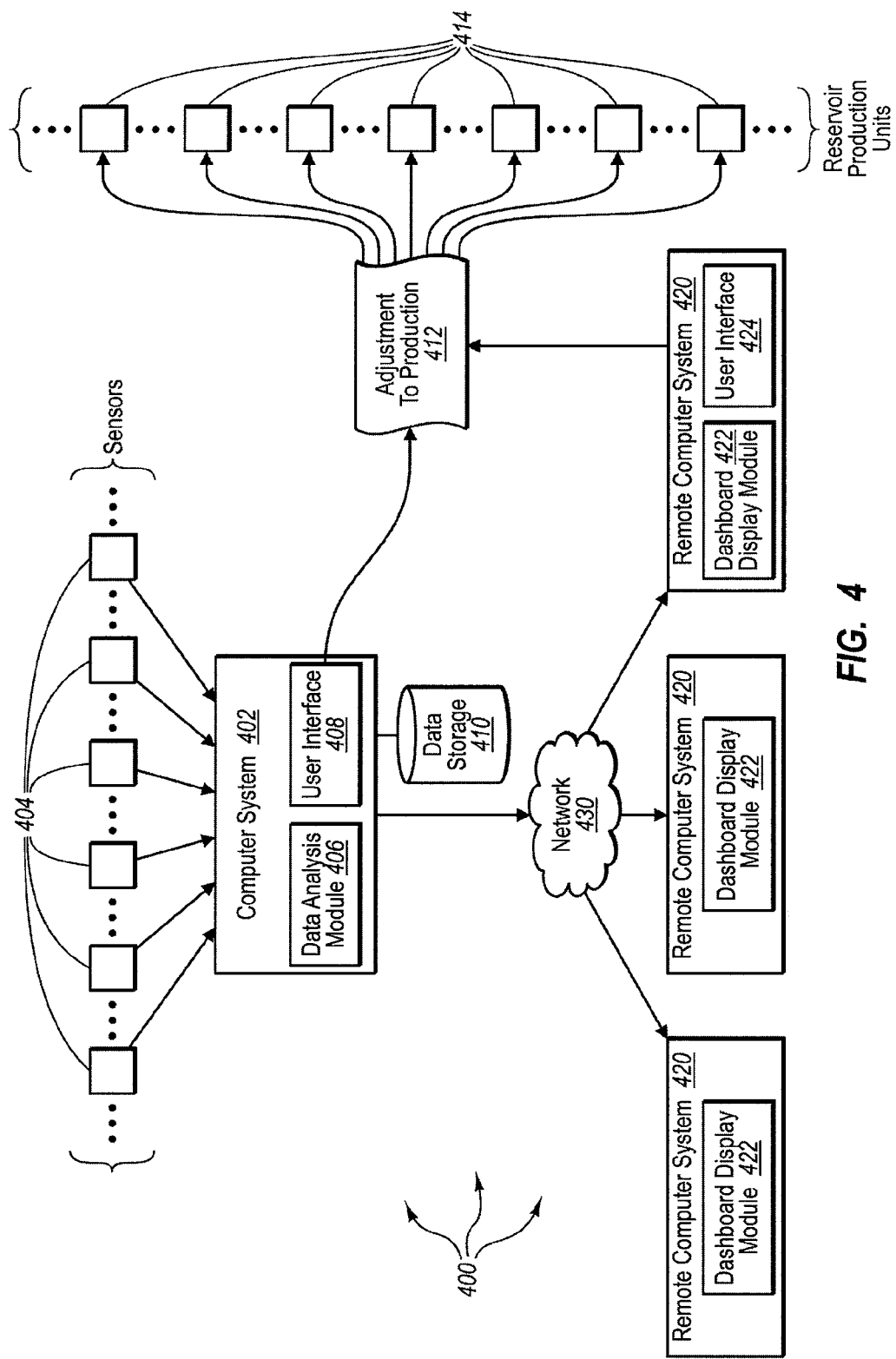
FIG. 4 schematically illustrates exemplary computer architecture that can be used to gather, analyze and/or display data gather from and about a petroleum reservoir.

FIG. 4 illustrates an exemplary computer-implement monitoring system 400 that monitors reservoir performance, analyzes information regarding reservoir performance, displays dashboard metrics, and optionally provides for computer-controlled modifications to maintain optimal oil well performance. Monitoring system 400 includes a main data gathering computer system 402 comprised of one or more computers located near a reservoir and linked to reservoir sensors 404. Computer system 402 may comprise a plurality of networked computers (e.g., each of which is designed to analyze a sub-set of the overall data generated by and received from the sensors 404). Reservoir sensors 404 are typically positioned at producing oil well, and may include both surface and sub-surface sensors. Sensors 404 may also be positioned at water injection wells, observation wells, etc. The data gathered by the sensors 404 can be used to generate performance metrics (e.g., leading and lagging indicators of production and recovery). The computer system 402 may therefore include a data analysis module 406 programmed to generate metrics from the received sensor data. A user interface 408 provides interactivity with a user. Data storage device or system 410 can be used for long term storage of sensor data and/or metrics.

According to one embodiment, the computer system 402 can provide for at least one of manual or automatic adjustment to production 412 by reservoir production units 414 (e.g., producing oil wells, water injection wells, gas injection wells, heat injectors, and the like, and sub-components thereof). Adjustments might include, for example changes in volume, pressure, temperature, well bore path (e.g., via closing or opening of well bore branches). The user interface 408 permits manual adjustments to production 412. The computer system 402 may, in addition, include alarm levels or triggers that, when certain conditions are met, provide for automatic adjustments to production 412.

Monitoring system 400 may also include one or more remote computers 420 that permit a user, team of users, or multiple parties to access information generated by main computer system 402. For example, each remote computer 420 may include a dashboard display module 422 that renders and displays dashboards (e.g., as illustrated in FIGS. 3A-3D), metrics, or other information relating to reservoir production. Each remote computer 420 may also include a user interface 424 that permits a user to make adjustment to production 412 by reservoir production units 414. Each remote computer 420 may also include a data storage drive (not shown).

Individual computer systems within monitoring system 400 (e.g., main computer system 402 and remove computers 420) can be connected to a network 430, such as, for example, a local area network ("LAN"), a wide area network ("WAN"), or even the Internet. The various components can receive and send data to each other, as well as other components connected to the network. Networked computer systems and computers themselves constitute a "computer system" for purposes of this disclosure.

Networks facilitating communication between computer systems and other electronic devices can utilize any of a wide range of (potentially interoperating) protocols including, but not limited to, the IEEE 802 suite of wireless protocols, Radio Frequency Identification ("RFID") protocols, ultrasound protocols, infrared protocols, cellular protocols, one-way and two-way wireless paging protocols, Global Positioning System ("GPS") protocols, wired and wireless broadband protocols, ultra-wideband "mesh" protocols, etc. Accordingly, computer systems and other devices can create message related data and exchange message related data (e.g., Internet Protocol ("IP") datagrams and other higher layer protocols that utilize IP datagrams, such as, Transmission Control Protocol ("TCP"), Remote Desktop Protocol ("RDP"), Hypertext Transfer Protocol ("HTTP"), Simple Mail Transfer Protocol ("SMTP"), Simple Object Access Protocol ("SOAP"), etc.) over the network.

Computer systems and electronic devices may be configured to utilize protocols that are appropriate based on corresponding computer system and electronic device on functionality. Components within the architecture can be configured to convert between various protocols to facilitate compatible communication. Computer systems and electronic devices may be configured with multiple protocols and use different protocols to implement different functionality. For example, a sensor 404 at an oil well might transmit data via wire connection, infrared or other wireless protocol to a receiver (not shown) interfaced with a computer, which can then forward the data via fast ethernet to main computer system 402 for processing. Similarly, the reservoir production units 414 can be connected to main computer system 402 and/or remote computers 420 by wire connection or wireless protocol.

C. Nomenclature and Definitions

RCAA™ utilizes a variety of reservoir performance metrics, including both leading and lagging indicators, that can provide information regarding the "DNA" of a reservoir. In addition, it utilizes unit development metrics, workload metrics, business plan metrics, and stretch goals. These indicators and metrics typically utilize specialized terminology and variables that may not be readily understood by the lay person. The following nomenclature and definitions are provided to clarify and enhance understanding of the disclosed metrics and how they may relate to reservoir properties.

| | |
|---|---|
| $B_o$ | Oil formation volume factor. The volume at reservoir conditions divided by the volume at standard conditions, dimensionless |
| $B_w$ | Water formation volume factor. The volume at reservoir conditions divided by the volume at standard conditions, dimensionless |
| C | Annual oil decline rate, $yr^{-1}$ |
| $E_A$ | Areal sweep efficiency. The area of the reservoir contacted by injected fluid divided by the total area, dimensionless |
| $E_D$ | Microscopic oil displacement efficiency. The volume of oil displaced divided by the total oil volume in place, dimensionless |
| $E_I$ | Vertical sweep efficiency. The vertical reservoir section contacted by injected fluid divided by the total section pay thickness, dimensionless |
| $E_R$ | Recovery efficiency or recovery factor. The fraction of initial hydrocarbon in place estimated to be recoverable, dimensionless |
| $E_{RM}$ | Mobile Oil Recovery Factor (MORE). The fraction of the Mobile OIIP estimated to be recoverable, dimensionless |
| $E_{RT}$ | Theoretical Maximum Recovery Factor (TMRF). The maximum fraction of the OIIP that can be recovered from a particular displacement process, dimensionless |
| $E_V$ | Volumetric sweep efficiency or volumetric conformance. The volume of the reservoir contacted by injected fluid divided by the total volume, dimensionless |
| $E_W$ | Waterflood Efficiency. The produced fraction of the mobile oil volume initially in place divided by the current water cut, dimensionless |
| EUR | Estimated Ultimate Recovery. The sum of the proved reserves and cumulative production at a specific time, stb |
| EUR Depletion Rate | Annual production volume expressed as a fraction of EUR, dimensionless. |
| $G_p$ | Cumulative gas produced, scf |
| $\Delta G_p$ | Incremental gas produced for a specific time period, scf |
| II | Injectivity Index. The injection rate divided by the excess pressure above reservoir pressure, stb/psi |
| $II_M$ | Median Injectivity Index. Median II value for all wells completed in a particular reservoir, stb/psi |
| $I_{VT}$ | Ideal Vertical Injectivity Index. II of a vertical full-penetration completion with no skin, stb/psi |
| $II_{DM}$ | Dimensionless Injectivity Index. $II_M$ divided by the median $II_{VT}$ for a particular reservoir, dimensionless |
| KPI | Key Performance Indicators |
| MER | Maximum Efficient Rate. Reservoir off-take rate above which will occur significant reduction in EUR, stb/d |
| L | Distance, ft |
| N | Oil Initially In Place (OIIP), stb |
| $N_M$ | Mobile Oil Initially In Place (MOIIP). Moveable oil volume under primary and secondary recovery (excluding EOR), stb |
| $N_P$ | Cumulative oil produced, stb |
| $N_{PDe}$ | Dimensionless cumulative oil volume. Expressed as a fraction of the Expected Ultimate Recovery, dimensionless |
| $N_{PDm}$ | Dimensionless cumulative oil volume. Expressed as a fraction of the Mobile Oil Initially In Place, dimensionless |
| $N_{PDo}$ | Dimensionless cumulative oil volume. Expressed as a fraction of Oil Initially In Place, dimensionless |
| $\Delta N_p$ | Incremental oil produced for a specific time period, stb |
| $p_e$ | Pressure at an external boundry, psi |
| $p_{wf}$ | Bottom hole flowing pressure, psi |
| $\Delta p_{dd}$ | Drawdown Pressure. The external boundary pressure minus the flowing sandface pressure, psi |
| $\Delta p_{dd(M)}$ | Median Pressure Drawdown. Median pressure drawdown value for all producing wells completed in a particular reservoir, psi |
| $\Delta p_{dd(IV)}$ | Ideal Vertical Pressure Drawdown. Drawdown pressure of a hypothetical vertical full-penetration completion with no skin, psi |
| $\Delta p_{dd(DM)}$ | Dimensionless Median Pressure Drawdown. The median pressure drawdown divided by the median ideal vertical drawdown pressure for a particular reservoir, dimensionless |
| PI | Productivity Index. The total production rate divided by the pressure drawdown, bpd/psi |
| $PI_M$ | Median Productivity Index. Median PI value for all wells completed in a particular reservoir, bpd/psi |
| PIIV | Ideal Vertical Productivity Index. PI of a hypothetical vertical full-penetration completion with no skin, bpd/psi |
| PIDM | Dimensionless Median Productivity Index. PIM divided by the median $PI_{IV}$ for a particular reservoir, dimensionless |
| PV | Pore Volume, stb |
| 1P* | Proved Reserves. Estimated quantities of hydrocarbons which geological and engineering data demonstrate with reasonable certainty to be recoverable in future years from known reservoirs under existing economic and operating conditions, stb |

-continued

| | |
|---|---|
| 1P Depletion Rate | Annual production volume expressed as a fraction of proved reserves, dimensionless |
| $q_g$ | Producing gas rate, mcfpd |
| $q_o$ | Producing oil rate, stbpd |
| $q_w$ | Producing water rate, stbpd |
| R | Producing ratio of gas to oil volume (GOR), scf/stb |
| $R_s$ | Solution gas-oil ratio (gas solubility in oil), scf/stb |
| $S_{or}$ | Remaining oil saturation, fraction of pore volume |
| $S_w$ | Water saturation, fraction of pore volume |
| VRR | Voidage Replacement Ratio. The injection volume divided by the produced production volume for a specific time period. Determined at both surface and reservoir conditions, dimensionless |
| WC | Water Cut. Water volume divided by liquid volume for a specific time period, dimensionless |
| $W_i$ | Cumulative water injected, stb |
| $\Delta W_i$ | Incremental water injected for a specific time, stb |
| $W_p$ | Cumulative water produced, stb |
| $\Delta W_p$ | Incremental water produced for a specific time, stb |

Equations

| | |
|---|---|
| EUR = | $1P + N_P$ or $E_R * N$ |
| EUR Depletion Rate = | $\Delta N_p / EUR$ |
| $E_R =$ | EUR/N or $E_A * E_I * E_D$ |
| $E_{RT} =$ | $N_M/N$ |
| $E_{RM} =$ | EUR/$N_M$ |
| $E_W =$ | $N_p/N_M/WC$ |
| $II_{DM} =$ | $(II/II_{IV})_M$ |
| N = | $PV * (1 - S_{wc})$ |
| $N_M =$ | $PV * (1 - S_{or} - S_{wc})$ |
| $N_{PDe} =$ | $N_p/EUR$ |
| $N_{PDm} =$ | $N_p/N_M$ |
| $N_{PDo} =$ | $N_p/N$ |
| $PI_{DM} =$ | $(PI/PI_{IV})_M$ |
| $\Delta p_{dd(DM)} =$ | $(\Delta p_{dd}/\Delta p_{dd(IV)})_M$ |
| 1P = | EUR - $N_p$ |
| 1P Depletion Rate= | $\Delta N_p/1P$ |
| $VRR_R =$ | $(\Delta W_i \times B_w)/((\Delta N_p \times B_o) + (\Delta W_p \times B_w))$ |
| $VRR_S =$ | $\Delta W_i/(\Delta N_p + \Delta W_p)$ |

The methodologies and definitions utilized by RCAA™ are intended to be consistent with industry standards and practices. The key standard for the definition of Proved Reserves is the United States Securities and Exchange Commission Regulation S-X (17 CFR 210.4-10-11/88). For Probable and Possible reserves and for Contingent Resources the reference standard is Petroleum Reserves and Resources Classification, Definitions, and Guidelines of Society of Petroleum Engineers (SPE), American association of Petroleum Geologists (AAPG), World Petroleum Congress (WPC) and Society of Petroleum Evaluation Engineers (SPEE) (2006).

D. Reservoir Performance Metrics

The reservoir performance metrics utilized in RCAA™ are generally classified as leading indicators, lagging indicators, unit development metrics, workload metrics, business plan metrics, and stretch goals. In general, leading indicators are more predictive of future productivity and/or recovery than lagging indicators. Lagging indicators may, however, provide an accurate accountability tool. Both types of indicators can be used to identify gaps between reality and the ideal and help improve production and recovery.

Figure 5A:
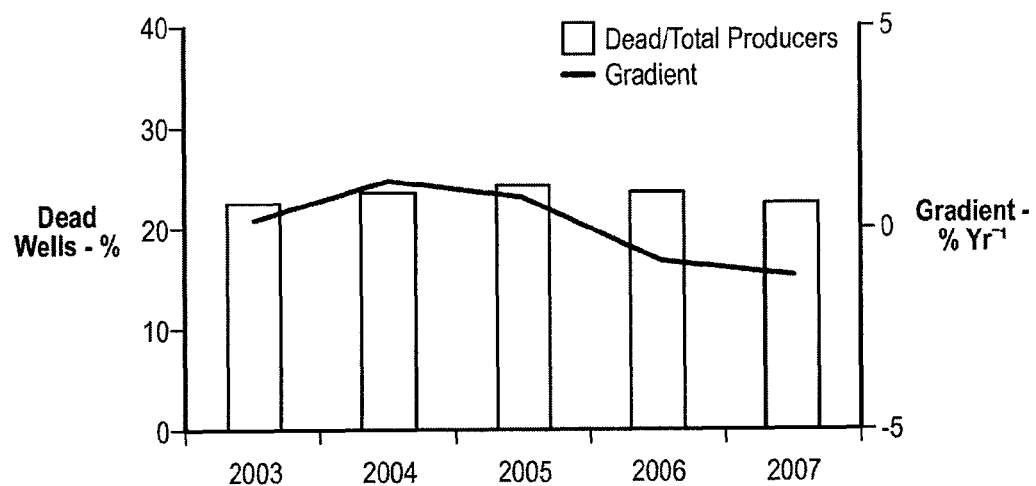
FIGS. 5A-5F are graphs which illustrate various leading indicators used to assess and/or enhance reservoir competence.

For each metric, unless otherwise specified, the assumptions regarding specific units or other aspects are as follows:
Assumptions
Time Interval: Annual
Scale: Reservoir
Pressure/Temperature Conditions: Surface
Units: English
1. Leading Indicators The following are examples of leading indicators that can be used in RCAA™. A first leading indicator is the "Dead Well Index". A related leading metric is the "Dead Wells Gradient". The Dead Well Index is determined by the number of dead wells divided by the sum of both dead and active producers. The ratio is therefore dimensionless. The Dead Wells Gradient is the normalized yearly rate of change of dead well index: (DWI), $(DWI_1-DWI_0)/DWI_0$, $yr^{-1}$. FIG. 5A is a bar graph that shows an exemplary year-to-year comparison of the Dead Well Index. It also includes a line showing the Dead Wells Gradient.

Figure 5B:
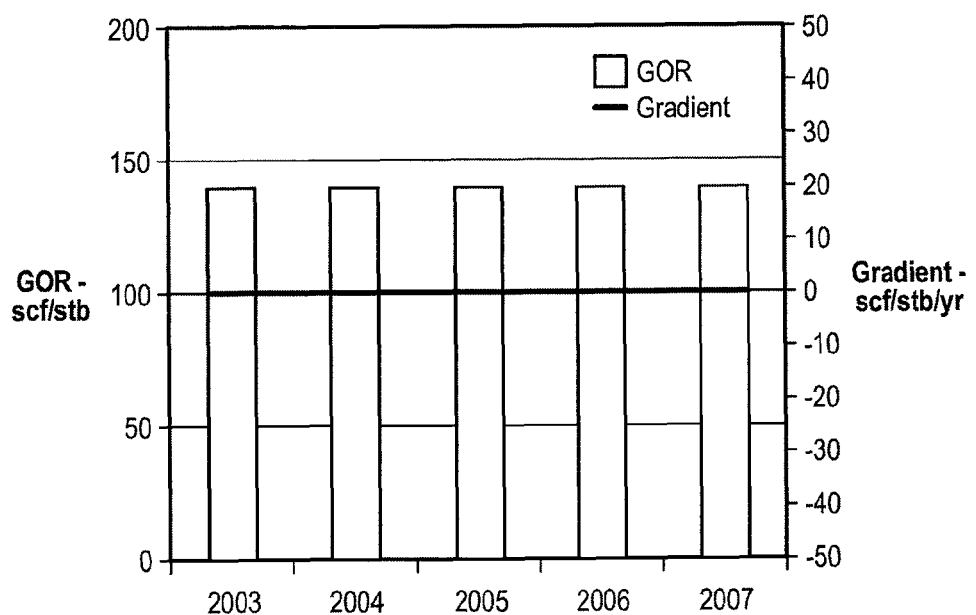

A second leading indicator is the "Gas Oil Ratio" (GOR). A related leading metric is the "Gas Oil Ratio Gradient". The Gas Oil Ratio is the producing ratio of gas to oil volume: $(R)=\Delta G_p/\Delta N_p$, scf/stb. The Gas Oil Ratio Gradient is the rate of change of the Gas Oil Ratio: GOR=$R_1-R_0$, $yr^{-1}$. FIG. 5B is a bar graph that shows an exemplary year-to-year comparison of the Gas Oil Ratio. It also includes a line showing the Gas Oil Ratio Gradient.

Figure 5C:
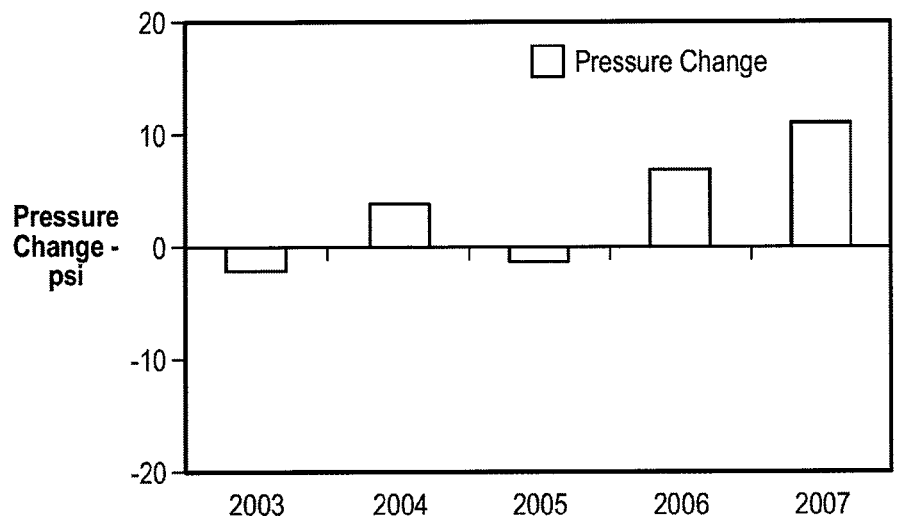

A third leading indicator is the "Reservoir Pressure Change". The Reservoir Pressure Change is the difference in annual volumetric weighted average reservoir pressure: psi-$yr^{-1}$. FIG. 5C is a bar graph that shows an exemplary year-to-year comparison of the Reservoir Pressure Change.

Figure 5D:
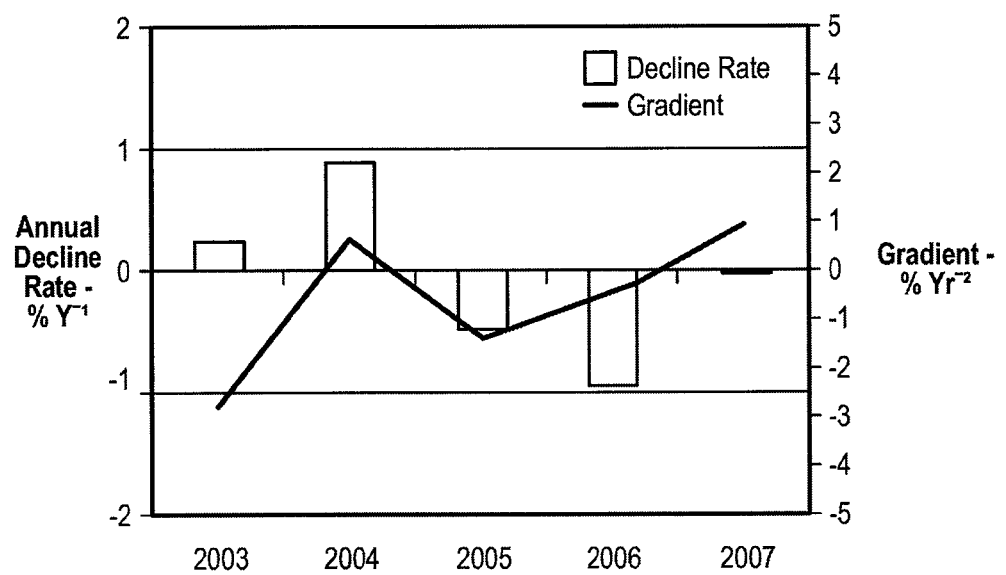

A fourth leading indicator is the "Oil Decline Rate". A related leading metric is the "Oil Decline Rate Gradient". The Oil Decline Rate is the normalized change in annual oil volume: $(C)=(\Delta N_{P0}-\Delta N_{p1})/\Delta N_{p1}$, $yr^{-1}$. The Oil Decline Rate Gradient is the annual change in Oil Decline Rate, or $C_1-C_0$, $yr^{-2}$. FIG. 5D is a bar graph that shows an exemplary year-to-year comparison of the Oil Decline Rate. It also includes a line showing the Oil Decline Rate Gradient.

Figure 5E:
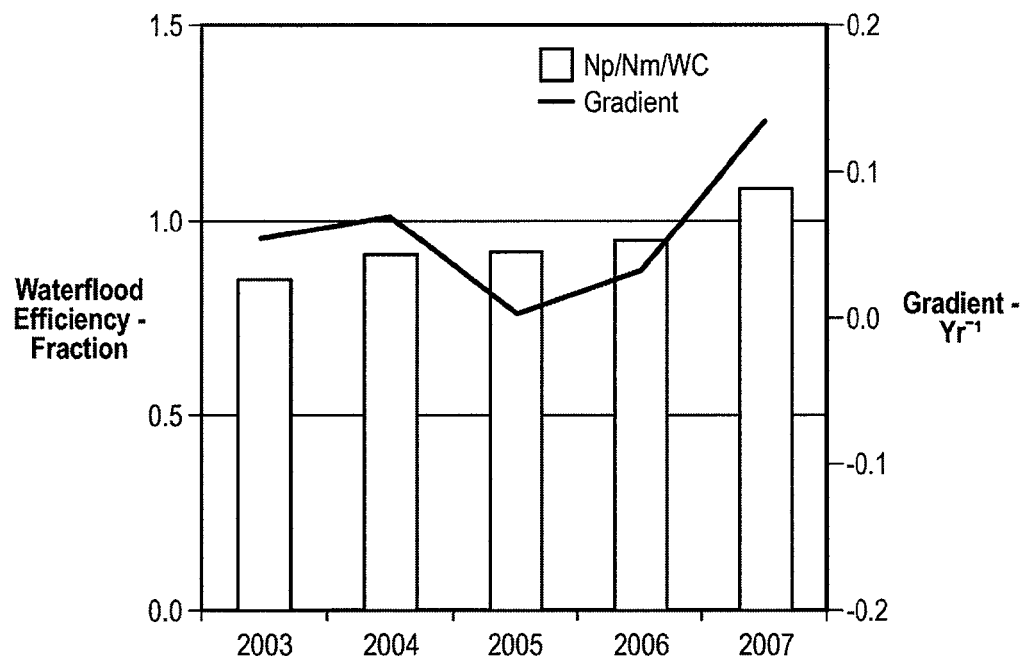

A fifth leading indicator is the "Waterflood Efficiency". A related leading metric is the "Waterflood Efficiency Gradient". The Waterflood Efficiency is defined as $(E_w)=N_p/N_M/WC$ and is dimensionless. The Waterflood Efficiency Gradient is the normalized yearly rate of change in waterflood efficiency: $(E_w)=E_{W1}-E_{W0}$, $yr^{-1}$. FIG. 5E is a bar graph that shows an exemplary year-to-year comparison of the Waterflood Efficiency. It also includes a line showing the Waterflood Efficiency Gradient.

Figure 5F:
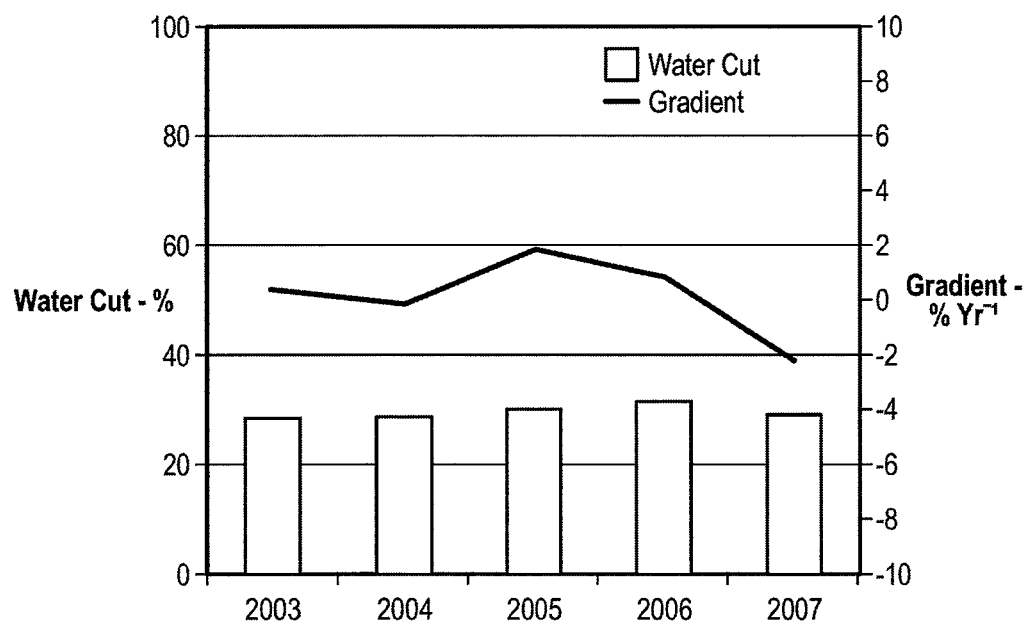

A sixth leading indicator is the "Water Cut". A related leading metric is the "Water Cut Gradient". The Water Cut is the producing ratio of water to liquid volume and is therefore dimensionless: $(WC)=\Delta W_p/(\Delta N_p+\Delta W_p)$. The Water Cut Gradient is the normalized yearly rate of change in water cut, or $WC_1-WC_0$, $yr^{-1}$. FIG. 5F is a bar graph that shows an exemplary year-to-year comparison of the Water Cut. It also includes a line showing the Water Cut Gradient.

2. Lagging Indicators

Figure 6A:
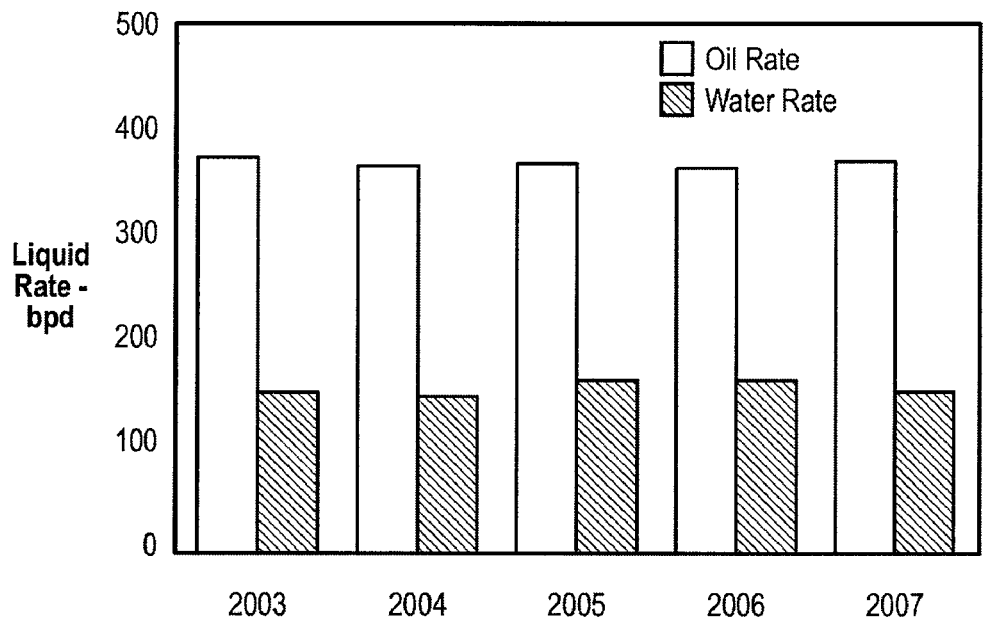
FIGS. 6A-6I are graphs which illustrate various lagging indicators used to assess and/or enhance reservoir competence.

The following are examples of lagging indicators that can be used in RCAA™. A first lagging indicator is the "Average Producer Liquid Rates", which includes both "Oil Rate" and "Water Rate". The Oil Rate is the producing oil rate on a well basis: $(q_o)=\Delta N_p/365/$Number of Active Producers, bpd. The Water Rate is the producing water rate on a well basis: $(q_w)=\Delta W_p/365/$Number of Active Producers, bpd. FIG. 6A is a bar graph that shows an exemplary year-to-year comparison of the Oil Rate and Water Rate.

Figure 6B:
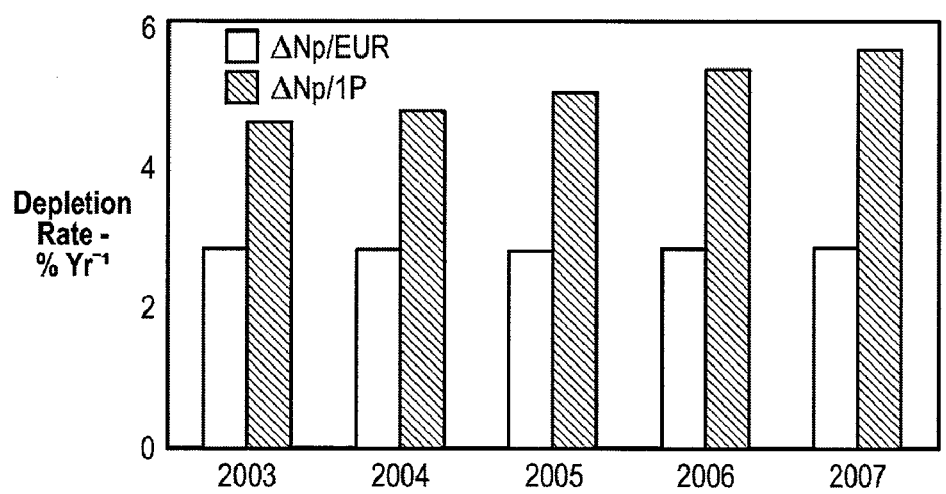

A second lagging indicator is the "Depletion Rate". A first type of Depletion Rate is the "Expected Ultimate Recovery (EUR) Depletion Rate", which equals $\Delta N_p/\text{EUR}$, and is dimensionless. A second type of Depletion Rate is the "Proved Reserves (1P) Depletion Rate" and is also dimensionless: 1P Depletion Rate=$\Delta N_p/1P$. FIG. 6B is a bar graph that shows an exemplary year-to-year comparison of the Expected Ultimate Recovery (EUR) Depletion Rate and 1P Depletion Rate.

Figure 6C:
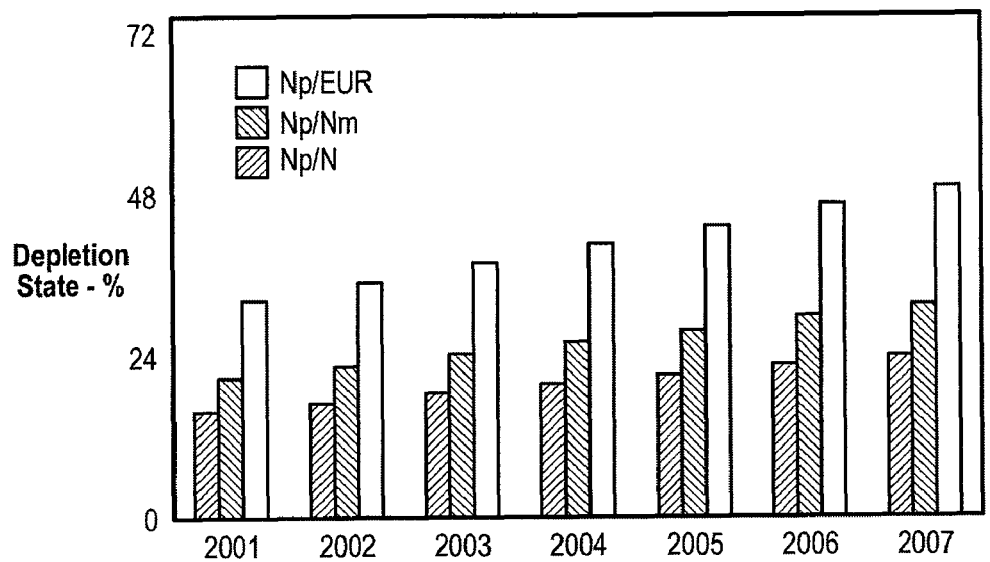

A third lagging indicator is the "Depletion State". A first type of Depletion State is the "Expected Ultimate Recovery Depletion State" and is dimensionless: $(N_{DPe})=N_p/\text{EUR}$. A second type of Depletion State is the "Mobile Original Oil Initially in Place (OIIP) Depletion State" and is also dimensionless: $(N_{PDm})=N_p/N_M$. A third type of Depletion State is simply the OIIP Depletion State. FIG. 6C is a bar graph that shows an exemplary year-to-year comparison of the Expected Ultimate Recovery Depletion State, the Mobile OIIP Depletion State, and the OIIP Depletion State.

Figure 6D:
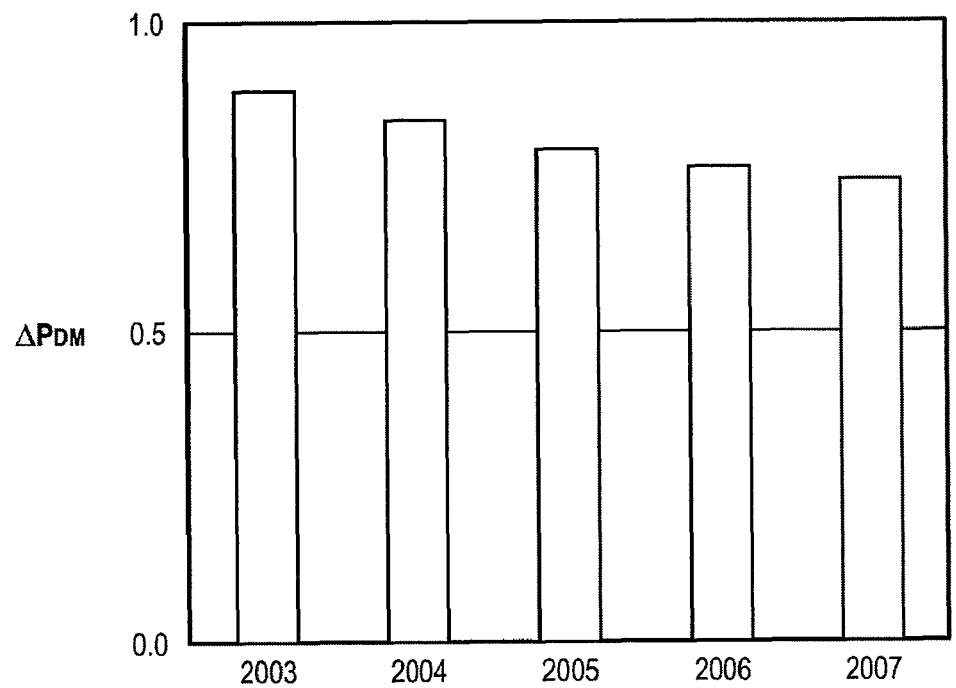

A fourth lagging indicator is the "Dimensionless Pressure Drawdown". The Dimensionless Pressure Drawdown is the median pressure drawdown divided by the median ideal vertical pressure drawdown, and is dimensionless: $(\Delta P_{dd(DM)})=\Delta P_{dd}/\Delta P_{dd(IV)})_M$. FIG. 6D is a bar graph that shows an exemplary year-to-year comparison of the Dimensionless Pressure Drawdown.

Figure 6E:
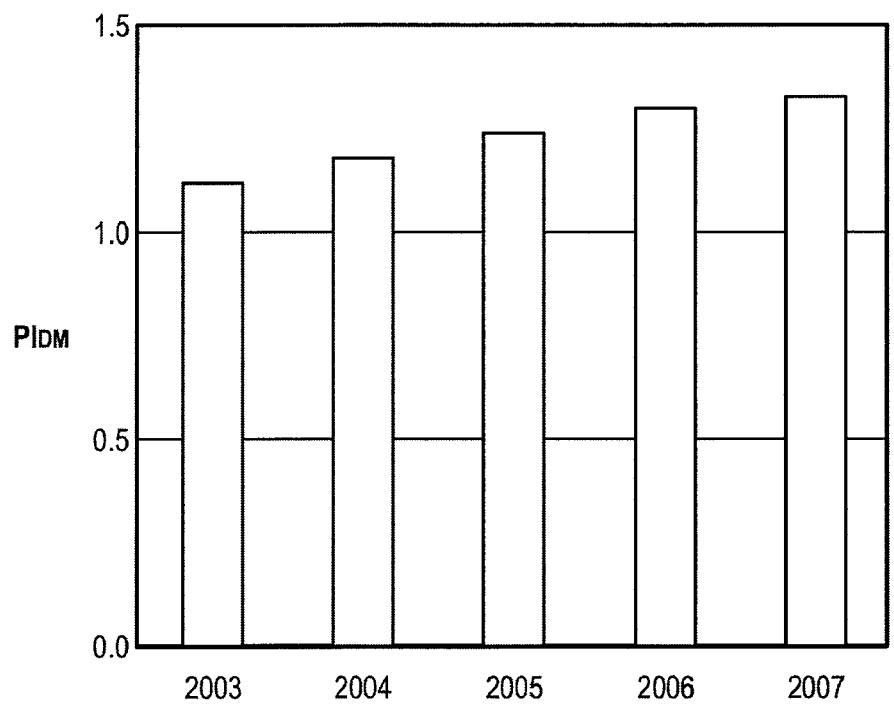

A fifth lagging indicator is the "Dimensionless Productivity Index". The Dimensionless Productivity Index is the median Productivity Index (PI) divided by the median ideal vertical Productivity Index and is dimensionless: $(PI/PI_{IV})_M$. FIG. 6E is a bar graph that shows an exemplary year-to-year comparison of the Dimensionless Productivity Index.

Figure 6F:
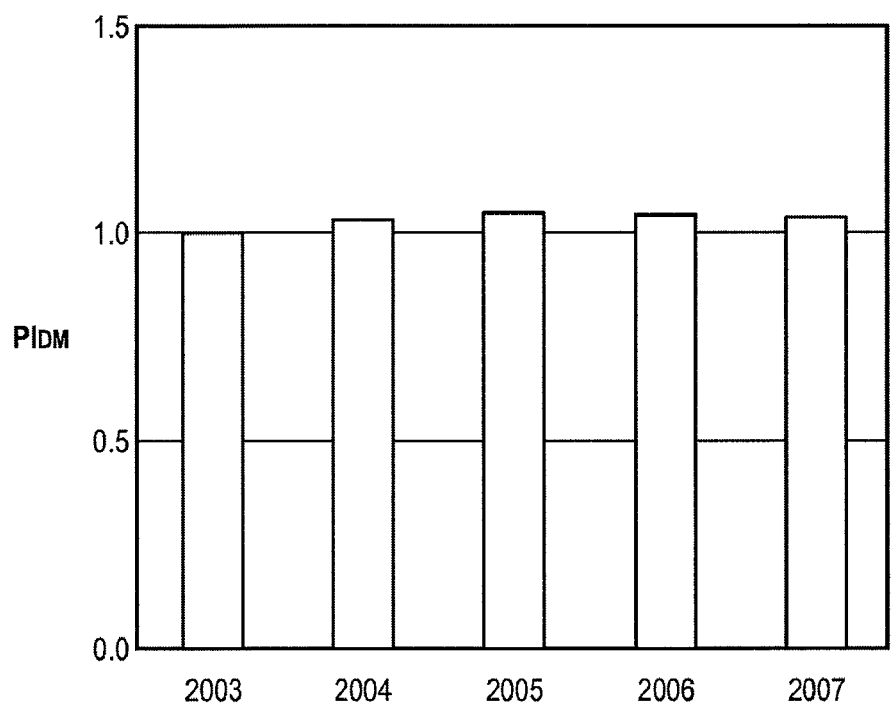

A sixth lagging indicator is the "Dimensionless Injectivity Index". The Dimensionless Injectivity Index is the median Injectivity Index (II) divided by the median ideal vertical Injectivity Index and is dimensionless: $(II)_{DM}=(II/II_{IV})_M$. FIG. 6F is a bar graph that shows an exemplary year-to-year comparison of the Dimensionless Injectivity Index.

Figure 6G:
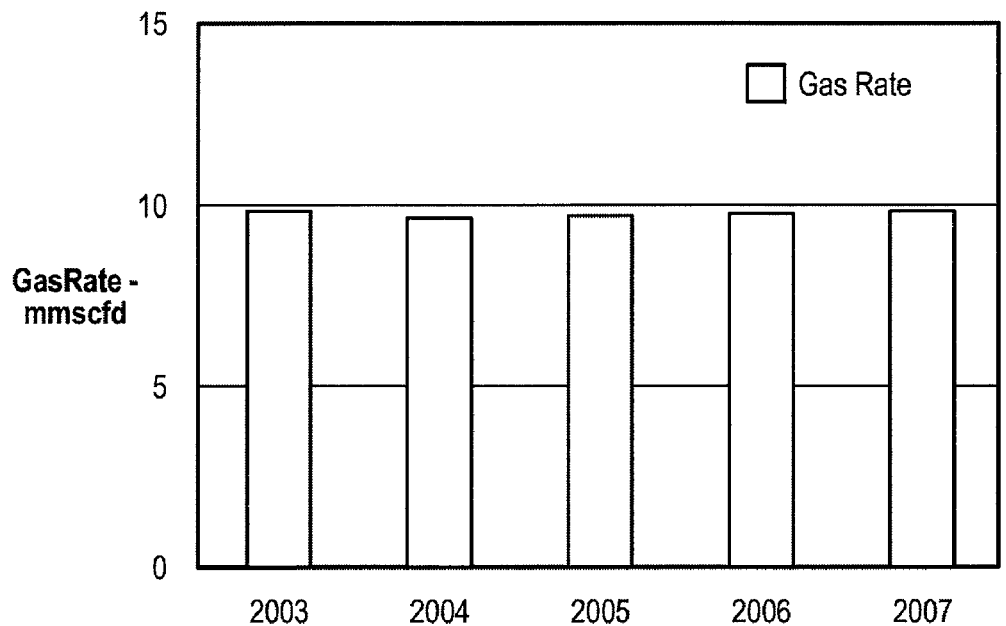

A seventh lagging indicator is the "Gas Rate". The Gas Rate is the Producing Gas Rate: $(q_g)=\Delta G_p/365$, mmsfcd. FIG. 6G is a bar graph that shows an exemplary year-to-year comparison of the Gas Rate.

Figure 6H:
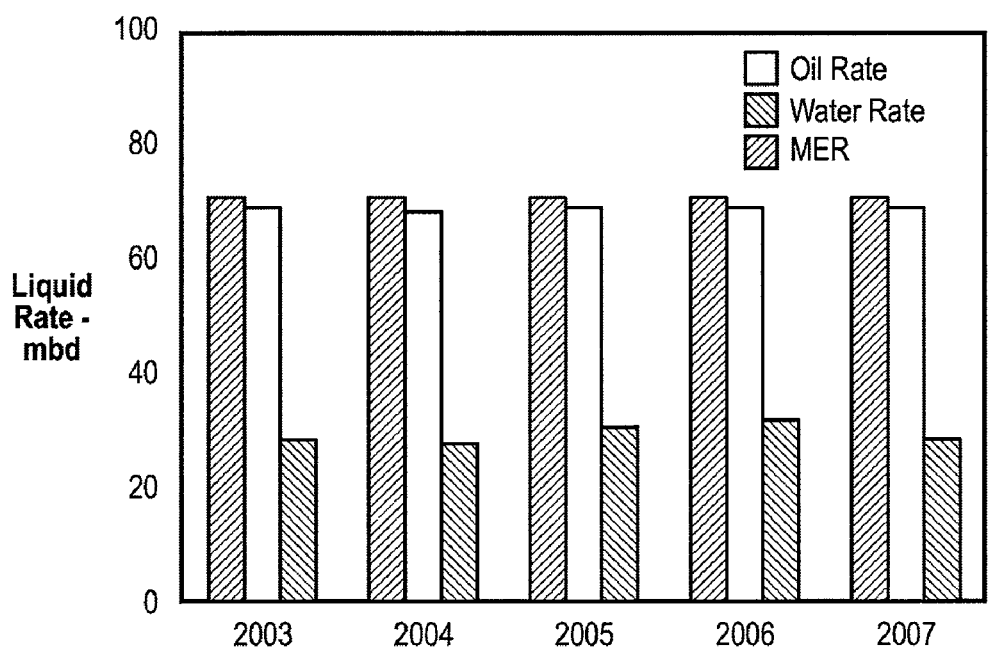

An eighth lagging indicator is the "Liquid Rate". A first type of Liquid Rate is the "Maximum Efficient Rate" (MER), mbd, and is the reservoir off-take rate above which will occur significant reduction in estimated ultimate recovery. A second type of Liquid Rate is the "Oil Rate", which is the producing oil rate: $(q_o)=\Delta N_p/365$, mbd. A third type of Liquid Rate is the "Water Rate", which is the producing water rate: $(q_w)=\Delta W_p/365$, mbd. FIG. 6H is a bar graph that shows exemplary year-to-year comparisons of the MER, oil rate and water rate.

A ninth lagging indicator is the "Pressure Gradient". The Pressure Gradient is the median pressure difference across a distance, e.g., the pressure difference between a producer and injector divided by the distance, or $\Delta p/L$, psi/ft.

A tenth lagging indicator is the "Productivity Index Gradient". The Productivity Index Gradient is the change in the median productivity index as a result of reservoir compaction: $1-(PI_{M1}/PI_{M0})$, bpd/psi.

An eleventh lagging indicator is "Rate Restrictions". Rate Restrictions are the sum of wellhead potential rates minus the sum of restricted rates, mbd. A variation includes Dimensionless Rate Restrictions, which are the effective rate restrictions divided by MSC, dimensionless.

A twelfth lagging indicator is the "Recovery Efficiency". A first type of Recovery Efficiency is the "Oil Recovery Factor": $(E_R)=\text{EUR}/N$, dimensionless. A second type of Recovery Efficiency is the "Mobile Oil Depletion Efficiency": $(E_{RM})=\text{EUR}/N_M$, dimensionless. A third type of Recovery Efficiency is the Theoretical Maximum Recovery Factor: $(E_{RT})=N_M/N$, dimensionless.

A thirteenth lagging indicator is the "Transmissibility Index". The Transmissibility Index is the permeability-cross-sectional area product divided by distance: $kA/L$, and md-ft.

Figure 6I:
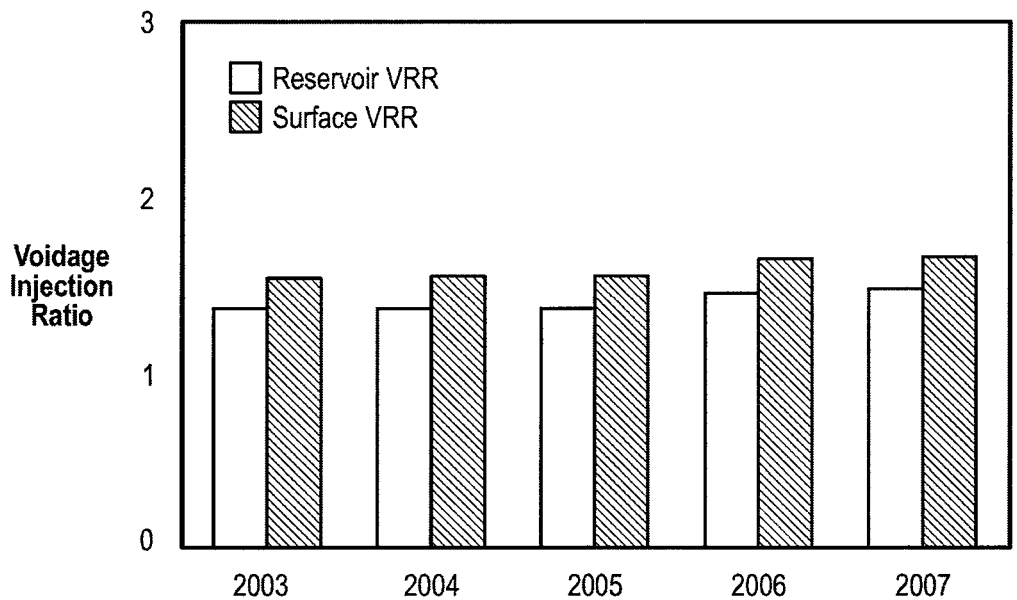

A fourteenth lagging indicator is the "Voidage Replacement Ratio" (VRR). A first type of Voidage Replacement Ratio is the "Surface Voidage Replacement Ratio", which is the VRR at surface conditions of pressure and temperature: $\Delta W_i/(\Delta N_p+\Delta W_p)$, dimensionless. A second type of Voidage Replacement Ratio is the "Reservoir Voidage Replacement Ratio", which is the VRR at reservoir conditions of pressure and temperature: $(\Delta W_i \times B_w)/((\Delta N_p \times B_o)+(\Delta W_p \times B_w))$, dimensionless. FIG. 6I is a bar graph that shows exemplary year-to-year comparisons of the Surface Voidage Replacement Ratio and Reservoir Voidage Replacement Ratio.

3. Unit Development Metrics

Figure 7A:
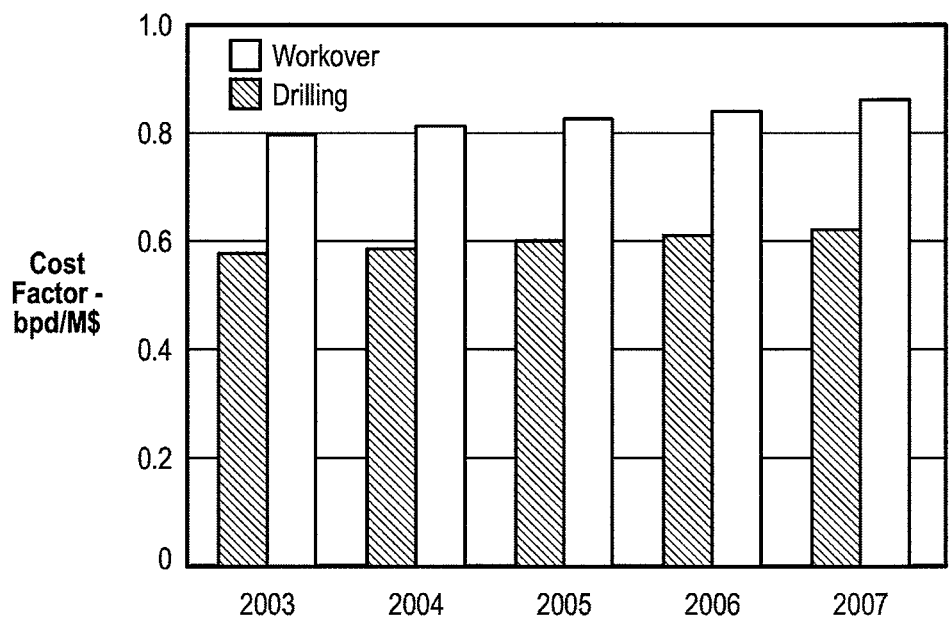
FIGS. 7A-7C are graphics which illustrate various unit development metrics used to assess and/or enhance reservoir competency.

A first unit development metric is the "Cost Factor". A first type of Cost Factor is the "Drilling Cost Factor", which is the average annual initial oil production rate divided by the drilling and completion cost, bpd/\$. A second type of Cost Factor is the "Workover Cost Factor", which is the average annual initial oil production rate divided by the workover cost, bpd/\$. FIG. 7A is a bar graph that shows exemplary year-to-year comparisons of the Drilling Cost Factor and Workover Cost Factor.

Figure 7B:
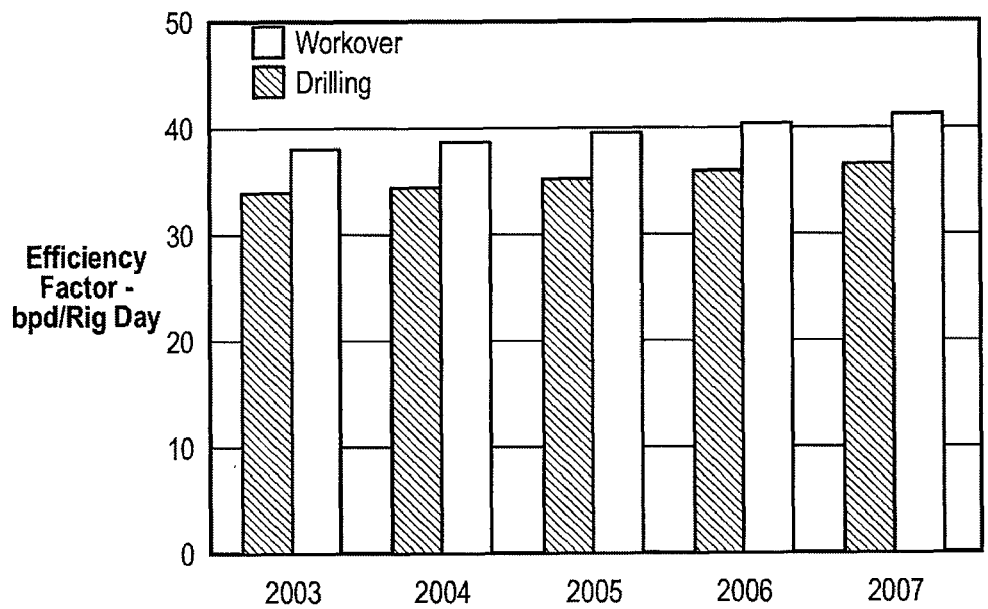

A second unit development metric is the "Efficiency Factor" (or Rig Efficiency Factor). A first type of Efficiency Factor is the "Drilling Efficiency Factor", which is the average annual initial oil production rate divided by the number of days required to drill and complete a well, bpd/rig-days. A second type of Efficiency Factor is the "Workover Efficiency Factor", which is the average annual initial oil production rate divided by the number of days required to workover a well, bpd/rig-days. FIG. 7B is a bar graph that shows exemplary year-to-year comparisons of the Drilling Efficiency Factor and Workover Efficiency Factor.

Figure 7C:
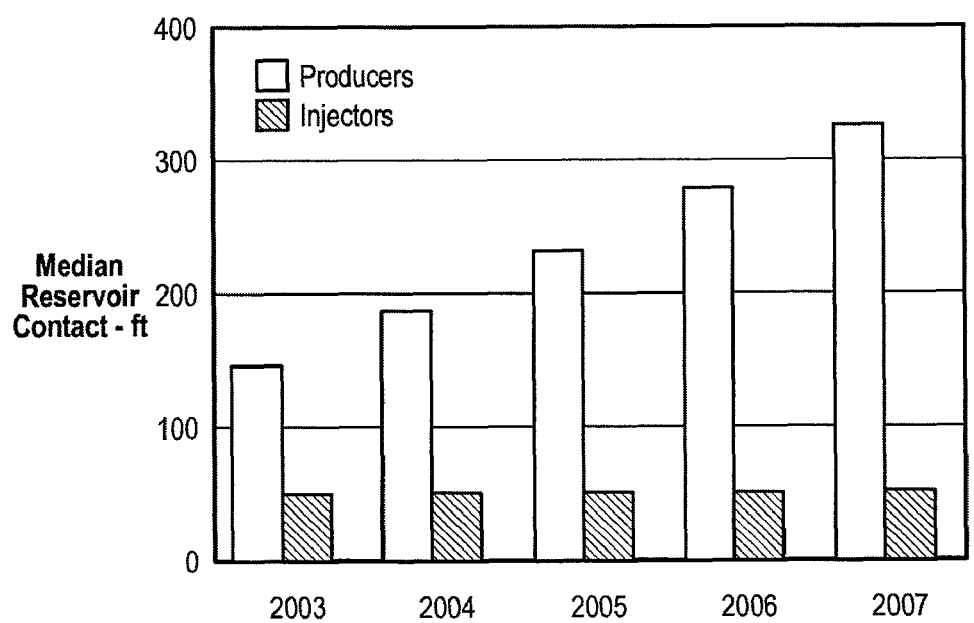

A third unit development metric is the "Median Reservoir Contact". A first type of Median Reservoir Contact involves producers, which measures the median producer reservoir contact, ft. A first type of Median Reservoir Contact involves injectors, which measures the median injector reservoir contact, ft. FIG. 7C is a bar graph that shows exemplary year-to-year comparisons of Median Reservoir Contact for both producers and injectors.

4. Workload Metrics

Figure 8A:
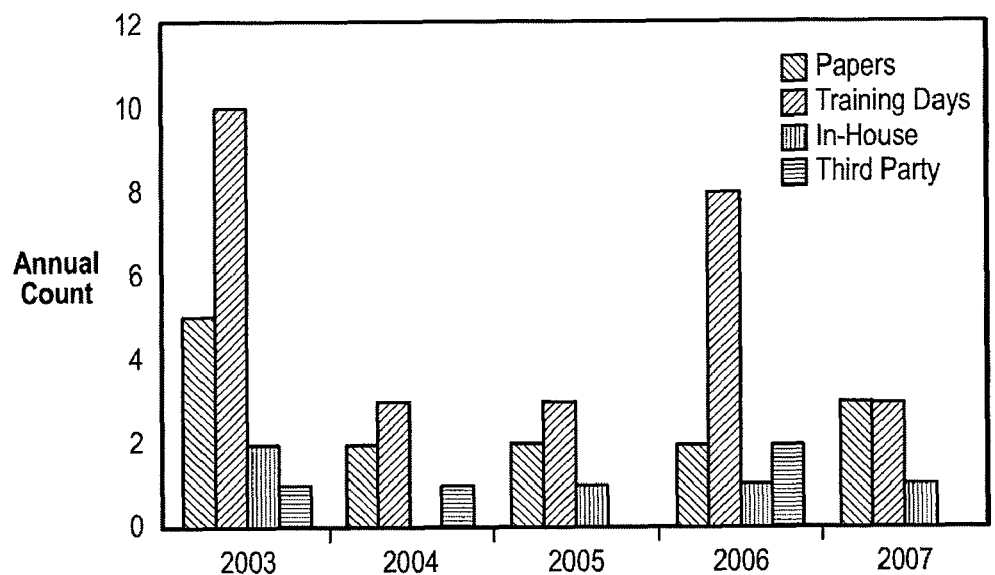
FIGS. 8A-8C are graphs which illustrate various workload metrics used to assess and/or enhance reservoir competency.

A first workload metric is Professional Training. A first type is Papers, or the number of papers submitted to outside organizations for presentation and/or publication, annual count. A second type is Training Days, or the number of days spent in in-house or third party courses divided by total professional manpower count, annual count. A third type is In-House Courses, or the number of in-house courses, annual count. A fourth type is Third Party Courses, or the number of third party courses, annual count. FIG. 8A is a bar graph that shows exemplary year-to-year comparisons of different types of Professional Training.

Figure 8B:
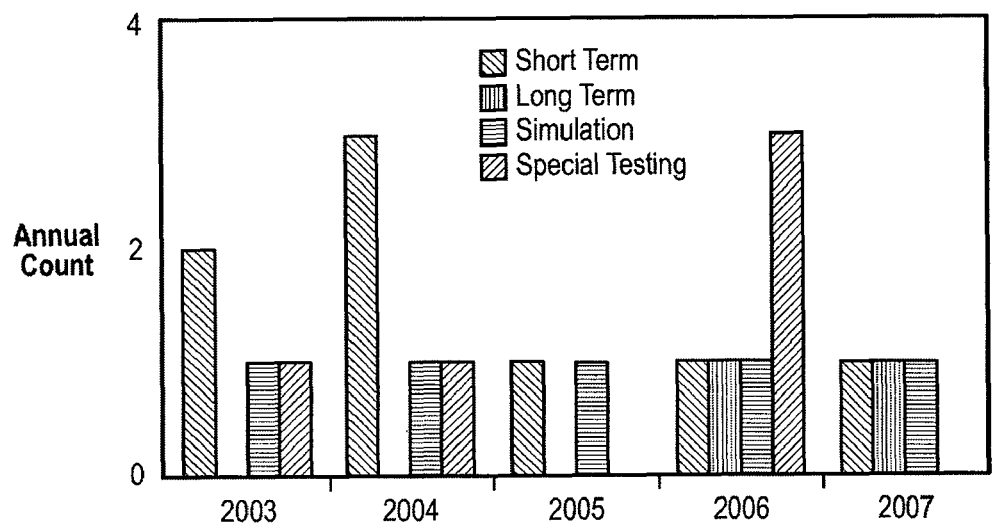

A second workload metric is Studies. A first type is Short Term, or ongoing studies (excluding simulation) lasting less than twelve months, annual count. A second type is Long Term, or ongoing studies (excluding simulation) lasting more than twelve months, annual count. A third type is Simulation, or ongoing numerical simulation studies, annual count. A fourth type is Special Testing, or ongoing lab/field trials of new methods/technologies, annual count. FIG. 8B is a bar graph that shows exemplary year-to-year comparisons of different types of Studies.

Figure 8C:
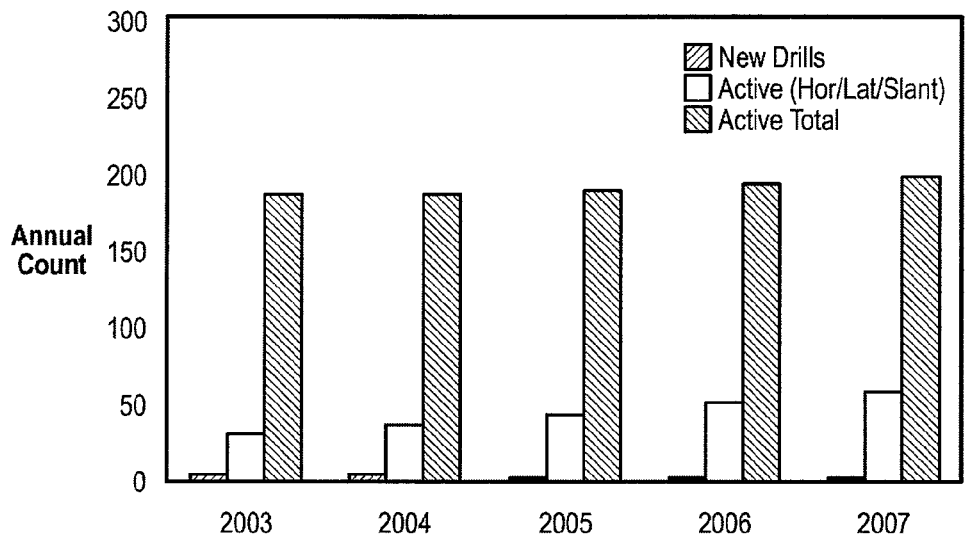

A third workload metric is the "Well Count". A first type of Well Count is "New Wells", which is the number of new wells drilled for the year, annual count. A second type of Well Count is "Active (Horizontal/Lateral/Slant)", which is the mean number of active non-vertical producers operating for the year, annual count. A third type of Well Count is "Active Total", which is the mean number of all active producers operating for the year, annual count. FIG. 8C is a bar graph that shows exemplary year-to-year comparisons of Well Count for each of New Wells, Active (Horizontal/Lateral/Slant), and Active Total.

5. Business Plan Metrics

Figure 9A:
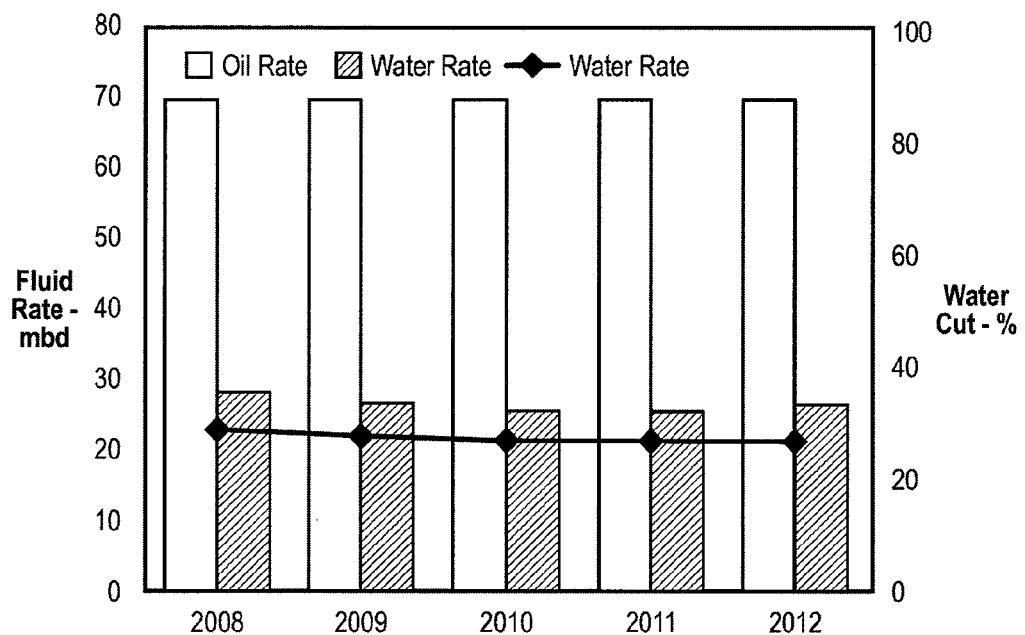
FIGS. 9A-9B are graphics which graphically illustrate various business plan metrics used to assess and/or enhance reservoir competency.

A first business plan metric is "Fluid Rates". A first type of Fluid Rate is the "Oil Rate", which is the forecast oil rate for a five year business planning cycle, mbd. A second type of Fluid Rate is the "Water Rate", which is the forecast water rate for a five year business planning cycle, mbd. A third type of Fluid Rate is the "Water Cut", which is the forecast water cut for a five year business planning cycle, mbd. FIG. 9A is a bar graph that shows exemplary year-to-year comparisons of Fluid Rates for each of Oil Rate, Water Rate, and Water Cut.

Figure 9B:
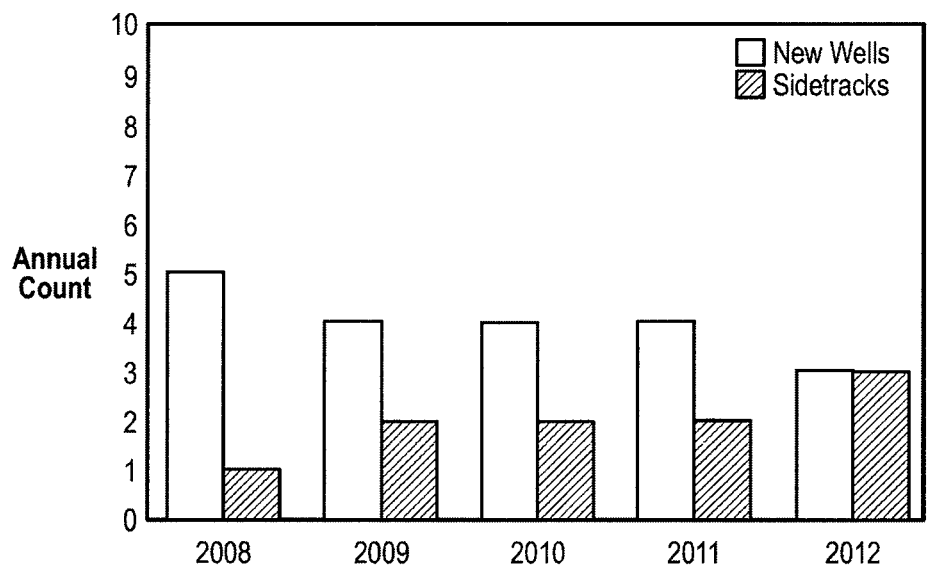

A first business plan metric is "Producer Drilling Requirements". A first type of Producer Drilling Requirement is "New Wells", or the total number of producers required to provide the forecast oil rate, annual count. A second type of Producer Drilling Requirement is "Sidetracks", or the total number of sidetracks of existing producers to provide the forecast oil rate, annual count. FIG. 9B is a bar graph that shows exemplary year-to-year comparisons of Producer Drilling Requirements for both New Wells and Sidetracks.

6. Stretch Goals

A first stretch goal is "Components". A first type of Components stretch goal is "Historical": the last five years of performance are provided for perspective. A second type is "Forecast": a five year business plan forecast that considers the current rate of implementation of new technologies and best practices. A third type is "Goal": a five year forecast that considers a 10% acceleration in the implementation of new technologies and best practices.

Figure 10A:
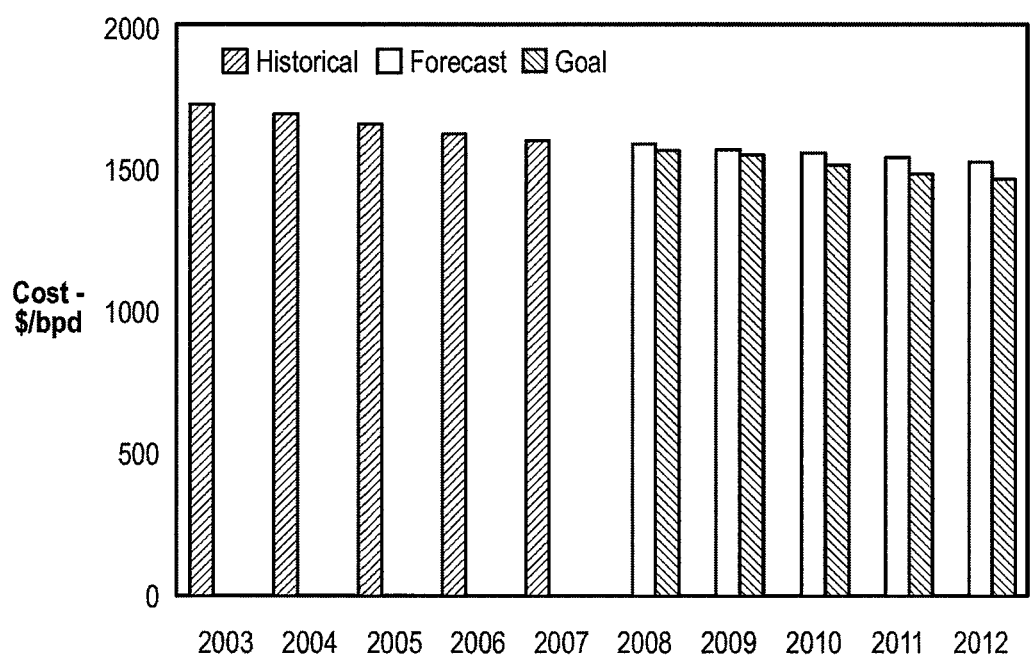
FIGS. 10A-10C are graphs which graphically illustrate various stretch goals used to assess and/or enhance reservoir competency.

A second stretch goal is "Production Development Cost". The Production Development Cost is the cost to drill and complete a well divided by its total cost, $/bpd. FIG. 10A is a bar graph that shows exemplary year-to-year comparisons and forecasts for Production Development Cost, particularly historical, forecast and goal.

Figure 10B:
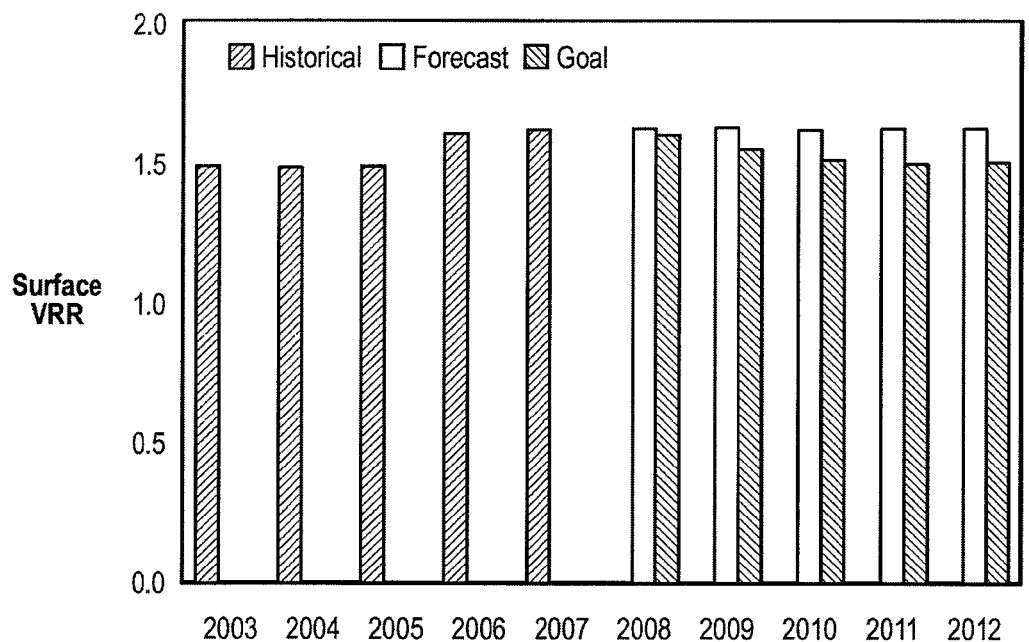

A third stretch goal is "Voidage Replacement Ratio" (VRR). One type is the Surfact VRR, which is the VRR at surface conditions: $\Delta W_i/(\Delta N_p+\Delta W_p)$, dimensionless. FIG. 10B is a bar graph that shows exemplary year-to-year comparisons and forecasts for Surface Voidage Replacement Ratio, particularly historical, forecast and goal.

Figure 10C:
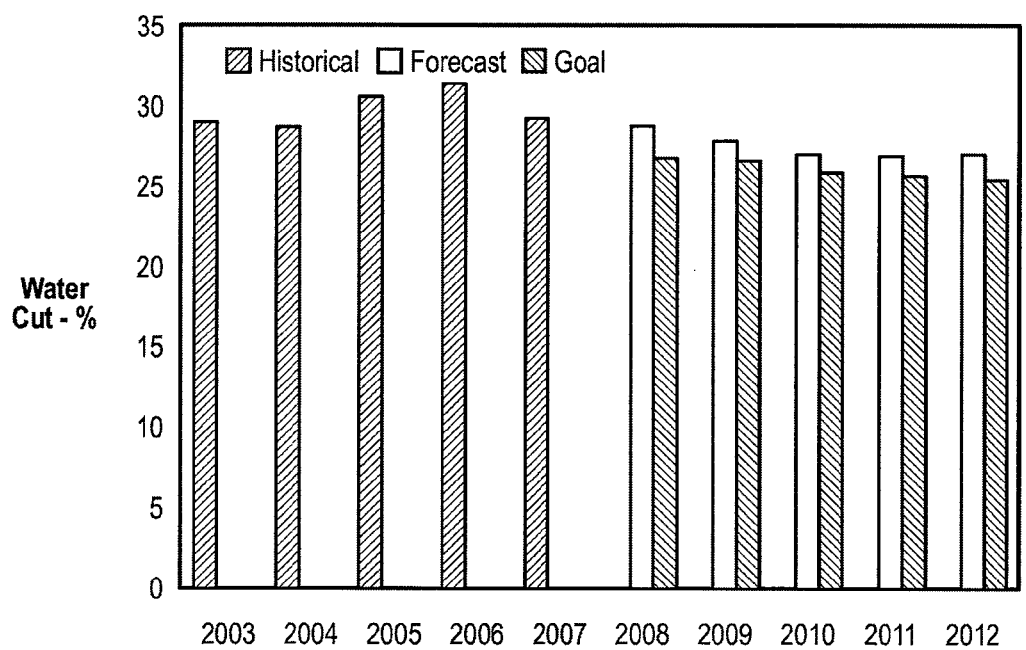

A fourth stretch goal is "Water Cut". The Water Cut is the producing ratio of water to liquid volume: $\Delta W_p/(\Delta N_p+\Delta W_p)$, dimensionless. FIG. 10C is a bar graph that shows exemplary year-to-year comparisons and forecasts for Water Cut, particularly historical, forecast and goal.

7. Integrative Metrics

RCAA™ integrates a wide variety of information; however, its success in arriving at optimal solutions derives from its ability to filter out non-critical parameters and recognize fundamental areas of reservoir underperformance. This is achieved by means of a set of metrics designated as "Integrative Metrics". Integrative Metrics (also called "Special Metrics") include:

1) Reservoir Management Rating (RMR™);
2) Production Gain Index (PGI™); and
3) Recovery Deficiency Indicator (RDI™).

Integrative Metrics provide a numerical assessment of critical reservoir performance parameters which, in turn, become the screening basis for planning and implementation of optimal solutions. As an example, a reservoir which scores poorly on RDI™ points to the fact that its recovery design is mismanaged. Case in point: a reservoir being depleted without the benefit of a pressure-maintenance or secondary-recovery process will have a low RDI™ score. Remedial actions will need to consider a secondary-recovery (e.g., waterflood). The Integrative Metrics will point in this direction very rapidly. As a result, correct application of RCAA™ will result in increased recoveries and production rates while providing superior utilization of capital.

a. Reservoir Management Rating

RMR™ is a structured approach for assessing the quality of reservoir management used in the recovery of hydrocarbons from a particular reservoir. It involves the use and analysis of a unique set of metrics, indices and quality measures as they relate to the physical state of the reservoir. the positioning and operation of wells (e.g., producers and injectors), and how the reservoir is managed (i.e., the long-term plan governing production and recovery). A detailed description of RMR™ is set forth in U.S. Provisional Application No. 61/154,503 which was filed Feb. 23, 2009, and entitled "METHOD OF ASSESSING THE QUALITY OF RESERVOIR MANAGEMENT," the disclosure of which is incorporated by specific reference.

In order to implement RMR™, a field is evaluated and judged (scored) on the basis of six categories using a letter grading system (A, B, C, and D). [See Table 2 below]. The letter grade assigned to the reservoir management provides a quick tool for judging the potential for increasing petroleum production and reserves.

The six categories and their definitions are as follows:

Reservoir Management Design: The engineering design of reserves recovery and rate of recovery (i.e., Depletion Plan) according to Best-in-Class Reservoir Management practices.

Reserves Appreciation: The re-design of the Depletion Plan is done to ensure the maximum recovery of reserves (i.e., Full-cycle Depletion Plan).

Development & Operating Plan: The assessment of the current recovery design and depletion plan in meeting performance objectives.

Reservoir Surveillance & Monitoring: The creation of a Master Plan to measure and assess critical reservoir parameters to ensure the maximum effective recovery and optimum reservoir performance.

Technology Application: The use of the most appropriate technology available.

Knowledge Management: The leveraging of corporate intellect to achieve positive results.

The six categories can be assessed according to the following criteria:

| | |
|---|---|
| Reservoir Management Design | Is there a Reservoir Management Design? Does the design include Reservoir Management Tenets? Have the tenets been applied in the correct fashion? |
| Reserves Appreciation | Have the components of reserves determination been validated? Have the risks to achieving and appreciating reserves been |

-continued

| | |
|---|---|
| | identified? Have contingency plans been prepared? |
| Development & Operating Plan | Are the desired design goals being achieved? |
| Reservoir Surveillance & Monitoring | How good are the Surveillance Programs (tracking the right parameters the right way)? |
| Technology Application | Are the most appropriate technologies being implemented to achieve the Recovery Design goals? How ready and receptive are you in considering state-of-the-art or alternate appropriate technologies? |
| Knowledge Management | Are systems in place to capture, correlate, and share mission critical information? |

DEFINITIONS OF ACRONYMS FOR RMR™ METRICS

The following is a list of definitions of the acronyms used in connection with metrics utilized in RMR™:

CTI: Completion Technology Index
DEI: Displacement Efficiency Index
DMI: Drawdown Management Index
DPRI: Displacement Process Risk Index
DR: Displacement Risk
DTI: Drilling Technology Index
EUR: Estimated Ultimate Recovery
FDI: Field Depletion Index
FPDI: Field Productivity Deficiency Index
GC: Geological Complexity
GMI: Gas Management Index
KMI: Knowledge Management Index
OVI: OIIP/GIIP Verification Index
PI: Production Index
PMI: Pressure Management Index
PPAI: Production Plan Achievement Index
PSI: Plateau Sustainability Index
RDI: Recovery Deficiency Indicator
RDTI: Reservoir Dynamics Technology Index
RMF: Risk Management Factor
RMI: Risk Mitigation Index (RMI)
RVI: Reserves Verification Index
SEI: Sweep Efficiency Index
SPDI: Surveillance Plan Design Index
SPII: Surveillance Plan Implementation Index
STI: Stimulation Technology Index
VAG: Value at Gain
VAR: Value at Risk
WMI: Water Management Index
WRDI: Well Rate/Drawdown Index

SCORING

A management score is assigned using the following weighting factors:

| Categories | Weighting % |
|---|---|
| Reservoir Management Design | 25 |
| Reserves Appreciation | 25 |
| Development & Operating Plan | 20 |
| Reservoir Surveillance | 10 |
| Technology Application | 15 |
| Knowledge Management | 5 |
| TOTAL | 100% |

The foregoing weighting factors are used to generate a Reservoir Management Rating™ (RMR™) Matrix, which identifies subcategories of metrics used to evaluate the competency of reservoir management within the various categories. The metrics are, in turn, used to generate a score. The Reservoir Management Rating™ (RMR™) Matrix is illustrated below in Table 1.

TABLE 1

| Reservoir Management Rating™ (RMR™) Matrix | | | | | |
|---|---|---|---|---|---|
| CATEGORY | RESERVOIR MANAGEMENT DESIGN (25%) | RESERVES APPRECIATION (25%) | DEVELOPMENT & OPERATING PLAN (20%) | RESERVOIR SURVEILLANCE (10%) | TECHNOLOGY APPLICATION (15%) |
| Subcategories | Recovery Design | OIIP/GIIP Verification | Production Plan Achievement | Master Plan Design | Drilling Technology |
| | Field Depletion Rate | Sweep Efficiency | Field Productivity | Master Plan Implementation | Completion Technology |
| | Well Rate/Drawdown | Displacement Efficiency | Pressure Management | | Stimulation Technology |
| | Displacement Process Risk | Reserves Verification | Gas Management | | Reservoir Dynamics Technology |
| | Plateau Sustainability | Risk Mitigation | Water Management Drawdown Management | | |
| KNOWLEDGE MANAGEMENT (5%) | | | | | |

A scoring scale for assessing reservoir management according to RMR™ is illustrated below in Table 2.

TABLE 2

| Scoring | | |
|---|---|---|
| Grade | QRI-Rating | Corresponding Points in Computing Analysis |
| A | **** | 86-100 |
| B | *** | 76-85 |
| C | ** | 61-75 |
| D | * | 60 or less |

Reservoir Management Design

The Reservoir Management Design has a weighting of 25% relative to the overall Reservoir Management Rating™. Important issues are 1) whether there is a Reservoir Management Design, 2) whether the design includes reservoir management tenets, and 3) whether the tenets been applied in the correct fashion. As set forth in Table 1 above, the Reservoir Management Design includes five subcategories, which are equally weighted relative to each other Subcategories (equally weighted):
1. Recovery Design
2. Field Depletion Rate
3. Well Rate/Drawdown
4. Displacement Process Risk
5. Plateau Sustainability The determination of each of the foregoing subcategories relating to Reservoir Management Design will now be described in more detail.

Recovery Design

The metric for Recovery Design is the Recovery Deficiency Indicator (RDI™). A more detailed description of RDI™ is disclosed in U.S. Provisional Application No. 61/101,008, which was filed Sep. 29, 2008, and entitled "ASSESSING PETROLEUM RESERVOIR RESERVES AND POTENTIAL FOR INCREASE", the disclosure of which is incorporated by specific reference. The RDI™ is defined or determined as follows:

$$RDI™ = RE/IRE * 100$$

where:
RE is the projected Recovery Efficiency for the current recovery process $$IRE \text{ (Ideal RE)} = E_A * E_I * E_D = 1 * 1 * E_D = E_D$$

where:
$E_A$ = the fraction of floodable pore volume area swept by a displacing fluid, The Ideal case assumes 100% swept.
$E_I$ = the fraction of the floodable pore volume in the vertical direction swept by a displacing fluid, The Ideal case assumes 100% swept.
$E_D$ = the fraction of movable oil, $(S_O - S_{OR})/S_O$ Field Depletion Rate The metric for Field Depletion Rate is the Field Depletion Index (FDI). The Field Depletion Index is defined or determined as follows:

$$FDI = \{(\text{Annual Production}/EUR) * RMF\} * 100$$

where:
EUR = Estimated Ultimate Recovery, Bb1
RMF = Risk Management Factor (determined in the following tables)

TABLE 3

Geological Complexity (GC)

| Variable | Degree | Result |
|---|---|---|
| Petrophysical Variability | High = 0 Mod = 1 Low = 2 | 0 to 2 |
| Stratification | High = 0 Mod = 1 Low = 2 | 0 to 2 |
| Fracture | High = 0 Mod = 1 Low = 2 | 0 to 2 |
| Faults | High = 0 Mod = 1 Low = 2 | 0 to 2 |
| Total | | 0 to 8 |

TABLE 4

Risk Management Factor Determination (RMFD)

| Variable | Scoring | Result |
|---|---|---|
| Geological Complexity | GC/8 * 20 | 0 to 20 |
| Gas Cap | (1 − Gas Fraction HC Volume) * 20 | 0 to 20 |
| Fluid Composition | Uniform = 20 Complex = 0 | 0 to 20 |
| Mobility Ratio* | −15 * Log(M) + 10 | 0 to 20 |
| Total | | 0 to 80 |

* mobility ratio is $M = (k_w/\mu_w)(\mu_o/k_o)$

TABLE 5

Risk Management Factor (RMF)

| Risk Assessment | RMFD | Result |
|---|---|---|
| Low | 60 to 80 | 1 |
| Medium | 40-60 | 1.5 |
| High | 0-40 | 2 |

TABLE 6

Field Depletion Index (FDI)

| FDI % | Score |
|---|---|
| <2 | 85 |
| 2 to 5 | 95 |
| 6 to 10 | 75 |
| >10 | 60 |

Well Rate/Drawdown

The metric for Well Rate/Drawdown is the Well Rate/Drawdown Index (WRDI), which can be determined according to the factors listed in Table 7.

Table 7

Well Rate/Drawdown Index (WRDI)

| Critical Questions | Score |
|---|---|
| Have analogs been used to develop the guidelines for individual well drawdowns and well rates? | 0-30 |
| Have empirical calculations been used to develop the guidelines for individual well drawdowns and well rates? | 0-30 |
| Have simulation studies been used to develop the guidelines for individual well drawdowns and well rates? | 0-40 |
| WRDI | 0-100 |

Displacement Process Risk

The metric for Displacement Process Risk is the Displacement Process Risk Index (DPRI), which is defined or determined below. (Proviso: IF the downside risk of recovering 2P reserves has not been determined, THEN assign "60" to this subcategory and continue to the next subcategory.)

$$DPRI = DR * Q * 100$$

where:
DP = Displacement Risk = $(2P - V_A R_{current})/2P$
2P = Proved + Probable Reserves, Bb1
$V_A R_{current}$ = the amount of 2P reserves at risk under the current recovery mechanism, Bb1
Q = Quality of Analysis measures the quality of the analysis of the 2P and the $V_A R$ (see Table 8)

TABLE 8

Quality of Analysis

| Analysis | Q |
|---|---|
| Excellent | 0.9 to 1.0 |
| Above Average | 0.8 to 0.9 |
| Average | 0.6 to 0.8 |
| Poor | <0.6 |

Plateau Sustainability

The metric for Plateau Sustainability is the Plateau Sustainability Index (PSI), which is defined or determined below, with further reference to Table 9. (Proviso: IF the field depletion plan does not allow for plateau production, THEN assign "60" to this subcategory and continue to the next subcategory.)

PSI=%EUR@ Decline Rate Onset*RMF where:

Decline Rate Onset=the point at which no further actions (e.g., drilling new wells or workovers) can reverse natural decline under the current displacement process.

RMF (See Field Depletion Rate for value determination.)

TABLE 9

Plateau Sustainability Index (PSI)

| % EUR @ Decline Rate Onset * RMF | Score |
|---|---|
| >50 | 95 |
| 40 to 50 | 85 |
| 30 to 40 | 75 |
| <30 | 60 |

Reserves Appreciation

The Reserves Appreciation has a weighting of 25% relative to the overall Reservoir Management Rating™. Important issues are 1) whether the components of reserves determination been validated, 2) whether the risks to achieving and appreciating reserves been identified, and 3) whether contingency plans been prepared. As set forth in Table 1 above, the Reserves Appreciation includes five subcategories, which are equally weighted relative to each other Subcategories (equally weighted):
1. OIIP/GIIP Verification
2. Sweep Efficiency
3. Displacement Efficiency
4. Reserves Verification
5. Risk Mitigation The determination of each of the foregoing subcategories relating to Reserves Appreciation will now be described in more detail.

OIIP/GIIP Verification

The metric for OIIP/GIIP Verification is the OIIP/GIIP Verification Index (OVI). The OVI is determined according to the following criteria set forth in Table 10.

TABLE 10

OVI Determination

| Critical Question | Result | Range |
|---|---|---|
| What is the geological complexity? | GC/8 * 20 | 0 to 20 |
| What is the quality of the geological/petrophysical model? | None = 0<br>Excellent = 20 | 0 to 20 |

TABLE 10-continued

OVI Determination

| Critical Question | Result | Range |
|---|---|---|
| What is the quality of the studies validating critical log parameters? | None = 0<br>Excellent = 20 | 0 to 20 |
| What is the quality of the studies/programs to verify net-pay cut-offs, field limits, $S_{WC}$, etc.? | None = 0<br>Excellent = 20 | 0 to 20 |
| What is the quality of the comprehensive OIIP/GIIP studies incorporating petrophysical, geological and geophysical data? | None = 0<br>Excellent = 20 | 0 to 20 |
| OVI | | 0 to 100 | where:

Geological Complexity (GC)

| Variable | Degree | Result |
|---|---|---|
| Petrophysical Variability | High = 0 Mod = 1 Low = 2 | 0 to 2 |
| Stratification | High = 0 Mod = 1 Low = 2 | 0 to 2 |
| Fracture | High = 0 Mod = 1 Low = 2 | 0 to 2 |
| Faults | High = 0 Mod = 1 Low = 2 | 0 to 2 |
| Total | | 0 to 8 |

Sweep Efficiency

The metric for Sweep Efficiency is the Sweep Efficiency Index (SEI). The Sweep Efficiency Index is defined or determined as follows (Proviso: IF the reservoir is under depletion or compression drive, THEN assign "NA" to this subcategory and continue to the next subcategory):

Sweep Efficiency Index (SEI)=$E_A*E_I$*100 where:

$E_A$=the fraction of floodable pore volume in the horizontal direction swept by a displacing fluid under the current plan, $E_i$=the fraction of the floodable pore volume in the vertical direction swept by a displacing fluid under the current plan.

Displacement Efficiency

The metric for Displacement Efficiency is the Displacement Efficiency Index (DEI). The Sweep Efficiency Index is defined or determined with reference to Table 11. (Proviso: IF the reservoir is under depletion or compression drive, THEN assign "NA" to this subcategory and continue to the next subcategory.)

TABLE 11

Displacement Efficiency Index (DEI)

| Critical Questions | Score |
|---|---|
| What is the quality of lab experiments done to verify verify Displacement Efficiency ($E_D$)? | None = 0<br>Excellent = 30 |
| What is the quality of field trials done to verify Displacement Efficiency ($E_D$)? | None = 0<br>Excellent = 30 |
| What is the quality of analysis of lab experiments and field trials that have been done to verify Displacement Efficiency ($E_D$)? | None = 0<br>Excellent = 40 |
| DEI | 0 to 100 |

Reserves Verification

The metric for Reserves Verification is the Reserves Verification Index (RVI). The Reserves Verification Index is defined or determined with reference to Table 12.

TABLE 12

RVI Determination

| Critical Question | Result | Score |
|---|---|---|
| What is the quality of field and lab data supporting 2P reserves? | None = 0<br>Excellent = 20 | 0 to 20 |
| What is the quality of field performance data supporting 2P reserves? | None = 0<br>Excellent = 30 | 0 to 30 |
| How well has the magnitude of the $V_A R$ (i.e., downside risk) relative to 2P reserves been determined? | None = 0<br>Excellent = 20 | 0 to 20 |
| How well has the magnitude of the $V_A G$ (i.e., upside potential) relative to 2P reserves been determined? | None = 0<br>Excellent = 10 | 0 to 10 |
| What is the quality of comprehensive reserves studies incorporating lab data, petrophysics, and geology and IOR/EOR supporting 2P reserves | None = 0<br>Excellent = 20 | 0 to 20 |
| RVI | | 0 to 100 | where:

$V_A R$=the amount of 2P reserves at risk under the current recovery mechanism, $V_A G$=the amount of increase in 2P reserves that can be recovered as a result of an improved reservoir management design.

Risk Mitigation

The metric for Risk Mitigation is the Risk Mitigation Index (RMI). The Risk Mitigation Index is defined or determined with reference to Table 13.

TABLE 13

Risk Mitigation Index (RMI)

| Critical Questions | Score |
|---|---|
| How well have key reservoir uncertainties been identified and ranked? | (0 to 10) * 3 |
| How well have leading indicators or signposts for downside results been identified? | (0 to 10) * 1.5 |
| How well have contingency plans been prepared for downside performance? | (0 to 10) * 1.5 |
| How well have leading indicators or signposts for upside results been identified? | (0 to 10) * 1.5 |
| How well have contingency plans been prepared for upside performance? | (0 to 10) * 1.5 |
| How well have lessons learned and best practices been incorporate into designs? | (0 to 10) * 1.0 |
| RMI | 0 to 100 |

FIG. 1 is a graph which illustrates how overall petroleum reserves of reservoir can be increases through risk mitigation as a result of implementation of RMR™.

Development and Operating Plan

The Development and Operating Plan has a weighting of 20% relative to the overall Reservoir Management Rating™. An important issue is whether the desired design goals and operating targets are being achieved. As set forth in Table 1 above, the Development and Operating Plan includes six subcategories, which are equally weighted relative to each other Subcategories (equally weighted):
1. Production Plan Achievement
2. Field Productivity
3. Pressure Management
4. Gas Management
5. Water Management
6. Well Rate/Drawdown Management The determination of each of the foregoing subcategories relating to Development and Operating Plan will now be described in more detail.

Production Plan Achievement

The metric for Production Plan Achievement is the Production Plan Achievement Index (PPAI). The Production Plan Achievement Index is defined or determined as follows, with further reference to Table 14.

$$PPAI = Variance_{1\text{-}year} + Variance_{5\text{-}year}$$

where:

$Variance_{year} = |(\Delta Np_{Actual} - \Delta Np_{Target})/\Delta Np_{Target}| * 100$, for 1 and 5 year periods.

TABLE 14

Production Plan Achievement Index (PPAI)

| PPAI (%) | Score |
|---|---|
| <10 | 95 |
| 11 to 20 | 85 |
| 21 to 30 | 75 |
| >30 | 60 |

Field Productivity

The metric for Field Productivity is the Field Productivity Deficiency Index (FPDI). The Field Productivity Deficiency Index is defined or determined as follows.

$$FPDI = (\Sigma J_{Actual}/\Sigma J_{Target}) * 100, \text{Maximum}=100$$

where:

J=Production Index (PI)

$J_{Target}$=the achievable field production index under current applicable technologies and current economics.

Pressure Management

The metric for Pressure Management is the Pressure Management Index (PMI). The Pressure Management Index is defined or determined as follows (Proviso: IF the reservoir is in its initial transient period, THEN assign "NA" to this subcategory and continue to the next subcategory):

$$PMI = (Reservoir\ Pressure_{Actual}/Reservoir\ Pressure_{Target}) * 100, \text{Maximum}=100$$

Gas Management

The metric for Gas Management is the Gas Management Index (GMI). The Gas Management Index is defined or determined with reference to Table 15. (Proviso: IF there is no gas cap or gas injection, THEN assign "NA" to this subcategory and continue to the next subcategory.)

TABLE 15

Gas Management Index (GMI)

| Critical Questions | Score |
|---|---|
| What is the annual ROC of producing GOR? | (1 − ROC) * 30<br>Minimum = 0 |
| What is the fraction of wells producing at or below solution GOR? | fraction * 30 |
| What is the fraction of wells shut-in due to high GOR? | (1-10 * fraction) * 40 |
| GMI | 0 to 100 | where:

Rate of Change (ROC)=$(GOR_{end} - GOR_{start})/GOR_{start}$

Water Management

The metric for Water Management is the Water Management Index (WMI). The Water Management Index is defined or determined as follows.

$$WMI = (1 - ROC_{actual}) * 100, \text{ Maximum} = 100, \text{ Minimum} = 0$$

where:

$ROC = (WC_{end} - WC_{start})/WCstart$ $WC_{end}$ = measured average water cut at the end of the year $WC_{start}$ = measured average water cut at the beginning of the year

Well Rate/Drawdown Management

The metric for Well Rate/Drawdown Management (or Drawdown Management) is the Drawdown Management Index (DMI). The Drawdown Management Index is defined or determined with reference to Table 16.

TABLE 16

Drawdown Management Index (DMI)

| Critical Questions | Score |
|---|---|
| % of wells operating with drawdowns and well rates within 10% of the design limit? | 0-100 |
| DMI | 0-100 |

Reservoir Surveillance

The category Reservoir Surveillance has a weighting of 10% relative to the overall Reservoir Management Rating™. An important issue is how good is the Surveillance Program (tracking the right parameters the right way at the right times). As set forth in Table 1 above, Reservoir Surveillance includes two subcategories, which are equally weighted relative to each other Subcategories (equally weighted):
1. Master Plan Design
2. Master Plan Implementation The determination of each of the foregoing subcategories relating to Reservoir Surveillance will now be described in more detail.

Master Plan Design

The metric for Master Plan Design is the Surveillance Plan Design Index (SPDI). The Surveillance Plan Design Index is defined or determined with reference to Table 17.

TABLE 17

Surveillance Plan Design Index (SPDI)

| Critical Questions | Score |
|---|---|
| Is there a documented Master Surveillance Plan? | Y = 100 N = 0 |
| Has an understanding of the physical process of the sreservoir at all cales been considered in the plan design? | Y = 100 N = 0 |
| Has an understanding of the facility and organizational capabilities been considered in the plan design? | Y = 100 N = 0 |
| Has a cost-benefit analysis been performed as a part of the surveillance plan design to reduce and optimize the uncertainty of the development and operating plans? | Y = 100 N = 0 |
| Have key wells been identified for pressure and saturation measurements and their frequency of measurement defined? | Y = 100 N = 0 |
| Does the plan define the method(s) and frequency of measuring producing and injection rates? | Y = 100 N = 0 |
| Is the procurement of lab and field PVT and petro-physical measurements integrated into the plan (includes coring and special logging)? | Y = 100 N = 0 |

TABLE 17-continued

Surveillance Plan Design Index (SPDI)

| Critical Questions | Score |
|---|---|
| Does the plan consider the testing and application of new surveillance technologies? | Y = 100 N = 0 |
| SPDI | (0 to 800)/8 |

Master Plan Implementation

The metric for Master Plan Implementation is the Surveillance Plan Implementation Index (SPII). The Surveillance Plan Implementation Index is defined or determined with reference to Table 18.

TABLE 18

Surveillance Plan Implementation Index (SPII)

| Critical Questions | Score |
|---|---|
| Is the Master Surveillance Plan reviewed and updated annually? | Y = 100 N = 0 |
| Has the organization accepted - including operations - the plan? | Y = 100 N = 0 |
| What percent of the key wells were utilized as planned? | Percent |
| What percent of producing and injection rate measurement events were captured as planned? | Percent |
| What percent of coring and special logging events considered plan objectives prior to acquisition? | Percent |
| What percent of the data is efficiently utilized by the organization? | Percent |
| SPII | (0 to 600)/6 |

Technology Application

The category Technology Application has a weighting of 15% relative to the overall Reservoir Management Rating™. Important issue are 1) whether the most appropriate technologies are being implemented to achieve the Recovery Design goals and 2) how ready and receptive is the reservoir owner or manager in considering state-of-the-art or alternate appropriate technologies. As set forth in Table 1 above, the category Technology Application includes four subcategories, which are equally weighted relative to each other.

Subcategories (equally weighted):
1. Drilling Technology
2. Completion Technology
3. Stimulation Technology
4. Reservoir Dynamics Technology The determination of each of the foregoing subcategories relating to Technology Application will now be described in more detail.

Drilling Technology

The metric for Drilling Technology is the Drilling Technology Index (DTI). The Drilling Technology Index is defined or determined with reference to Table 19.

TABLE 19

Drilling Technology Index (DTI)

| Critical Question | Result | Score |
|---|---|---|
| Have alternate drilling technologies been evaluated within the last 3 years? | No = 0 Yes = 20 | 0 to 20 |
| Have alternate drilling technologies been field tested within the last 3 years? | No = 0 Yes = 40 | 0 to 40 |
| Have alternate drilling technologies been deployed within the last 3 years? | No = 0 Yes = 40 | 0 to 40 |
| | DTI | 0 to 100 |

Completion Technology

The metric for Completion Technology is the Completion Technology Index (CTI). The Completion Technology Index is defined or determined with reference to Table 20.

TABLE 20

Completion Technology Index (CTI)

| Critical Question | Result | Score |
|---|---|---|
| Have alternate completion technologies been evaluated within the last 3 years? | No = 0<br>Yes = 20 | 0 to 20 |
| Have alternate completion technologies been field tested within the last 3 years? | No = 0<br>Yes = 40 | 0 to 40 |
| Have alternate completion technologies been deployed within the last 3 years? | No = 0<br>Yes = 40 | 0 to 40 |
| | CTI | 0 to 100 |

Stimulation Technology

The metric for Stimulation Technology is the Stimulation Technology Index (STI). The Stimulation Technology Index is defined or determined with reference to Table 21.

TABLE 21

Stimulation Technology Index (STI)

| Critical Question | Result | Score |
|---|---|---|
| Have alternate stimulation technologies been evaluated within the last 3 years? | No = 0<br>Yes = 20 | 0 to 20 |
| Have alternate stimulation technologies been field tested within the last 3 years? | No = 0<br>Yes = 40 | 0 to 40 |
| Have alternate stimulation technologies been deployed within the last 3 years? | No = 0<br>Yes = 40 | 0 to 40 |
| | STI | 0 to 100 |

Reservoir Dynamics Technology

The metric for Reservoir Dynamics Technology is the Reservoir Dynamics Technology Index (RDTI). The Reservoir Dynamics Technology Index is defined or determined with reference to Table 22.

TABLE 22

Reservoir Dynamics Technology Index (RDTI)

| Critical Question | Result | Score |
|---|---|---|
| Have alternate reservoir dynamics technologies been evaluated within the last 3 years? | No = 0<br>Yes = 20 | 0 to 20 |
| Have alternate reservoir dynamics technologies been field tested within the last 3 years? | No = 0<br>Yes = 40 | 0 to 40 |
| Have alternate reservoir dynamics technologies been deployed within the last 3 years? | No = 0<br>Yes = 40 | 0 to 40 |
| | RDTI | 0 to 100 | where:
  Reservoir Dynamics Technology includes formation evaluation and reservoir characterization, forecasting, surveillance and testing technologies.

Knowledge Management

The category Knowledge Management has a weighting of 5% relative to the overall Reservoir Management Rating™. Important issue are 1) what is the organization's commitment to knowledge sharing initiatives, 2) whether data quality is complete, uniform, and consistent, while maintaining integrity and lacking duplication, 3) whether the owner or manager has access to virtual collaboration environments and how well utilized they are, and 4) whether the owner or manager has access to daily, monthly, or annual reports critical to your operations.

The metric for Knowledge Management is the Knowledge Management Index (KMI), which is determined or defined with reference to Table 23.

TABLE 23

Knowledge Management Index (KMI)

| Critical Concern | Result | Score |
|---|---|---|
| Awareness<br>Knowledge of what to document, how to document it, how to access it via data bases, etc. Data sources are accessable and easy to use. | (1-100) * 0.20 | .2 to 20 |
| Behavior<br>Workflows are multidisciplinary, interactive, collaborative, and data-driven. Data Management Strategies are in place and adhered to. Real-time data acquisition and availability. | (1-100) * 0.20 | .2 to 20 |
| Output<br>Creation of data bases, white papers, lessons learned reports, best practice documentation, etc. Disparate data sources are integrated in meaningful ways. Trends and abnormalities are both identified and alerted to. | (1-100) * 0.30 | .3 to 30 |
| Outcomes<br>Critical know-how is retained, shared, and leveraged across the enterprise. KM impacts key measures of organizational performance such as decreased cycle times, CAPEX/OPEX improvements, and quality improvements. | (1-100) * 0.30 | .3 to 30 |
| | KMI | 1 to 100 |

All or part of the RMR™ method may be implemented using a conventional computer system comprised of one or more processors, volatile memory, non-volatile memory or system storage, and one or more input-output devices. An example is computer system 400 discussed above and illustrated in FIG. 4.

According to one embodiment for implementing RMR™, a method of assessing the quality of reservoir management used in the recovery of petroleum from a reservoir includes: 1) establishing reservoir management metrics for each of the following categories: a) reservoir management design, b) reserves appreciation, c) development and operating plan, d) reservoir surveillance and monitoring, e) technology application, and f) knowledge management; 2) weighting the reservoir management metrics according to the categories to which they belong; 3) obtaining data relating to the reservoir management metrics, at least some of the data being generated by at least one of (i) measuring a physical property of one or more producing oil wells and/or injector wells of the reservoir, (ii) taking and analyzing one or more core samples from the reservoir, or (iii) establishing a relationship between one or more different types of data from (i) or (ii); 4) generating the reservoir management metrics from the data; and 5) determining a reservoir management rating for the petroleum reservoir based on the reservoir management metrics, the reservoir management rating relating to at least one of production or recovery of petroleum from the reservoir.

b. Production Gain Index™

The Production Gain Index™ (PGI™) is a novel leading indicator and metric designed to quickly assess the potential for increases in productivity of an operating petroleum reservoir. A detailed description of PGI™ is set forth in U.S.

Provisional Application No. 61/101,024, filed Sep. 28, 2008, and entitled "ASSESSING PETROLEUM RESERVOIR PRODUCTION RATE THROUGH PRODUCTION GAIN INDEX," the disclosure of which is incorporated herein by specific reference. The Production Gain Index for a petroleum reservoir is defined as:

$$PGI = \frac{\sum \Delta q_A}{\sum q_{Old}}$$

A related index, the Global Productivity Index (GPI™), is defined as $$GPI = \frac{\sum J_{New}}{\sum J_{Old}}$$

wherein, $\Sigma \Delta q_A$=net actual production gain, stbpd (standard barrels produced per day);

$\Sigma q_{Old}$=sum of current oil rates for existing producers, stbpd $\Sigma J_{New}$=sum of productivity indices of all producers post project deployment, stbpd/psi;

$\Sigma J_{Old}$=Sum of productivity indices of all producers prior project deployment, stbpd/psi; and $C_E$=Interference factor, which is an empirically derived factor that accounts for the loss in the aggregate production gain due to well interference. Its formula is as follows:

$$C_E = \left(1 - \log_{10} \frac{\sum J_{New}}{\sum J_{Old}}\right)$$

The dimensionless Production Gain Index is based on the petroleum engineering concept of the productivity index (J), which is a measure of the ability of the well to produce. It is defined as the well's stabilized flow rate measured at surface conditions divided by the well's drawdown. Drawdown is the difference in static bottom-hole pressure and stabilized flowing bottom-hole pressure.

The production gain index (PGI) is a new method for quickly estimating the net gain in oil rate for a developed oil field (or reservoir) as a result of increasing aggregate well productivity. The means by which the aggregate well productivity for a field may be increased include drilling additional producing wells, stimulation of existing wells, and increasing the reservoir contact of existing wells. PGI enable engineers, managers, and investors to efficiently and quickly estimate the oil production rate, and financial gains, on a field basis when implementing certain types of capital projects. In general, the PGI is directly correlated with reservoir contact (i.e., the greater the increase in reservoir contact, the greater the expected PGI).

According to one embodiment, an exemplary process for determining the production gain index (RDI) includes: (1) determining or obtaining the net actual production gain, stbpd ($\Sigma \Delta q_A$), (2) determining or obtaining the sum of current oil rates for existing producers, stbpd ($\Sigma q_{Old}$), and (3) dividing the net actual production gain by the sum or current oil rates for existing producers according to the following equation:

$$PGI = \frac{\sum \Delta q_A}{\sum q_{Old}}$$

Alternatively, the PGI can be determined by (1) determining or obtaining the interference factor ($C_E$) for a reservoir, (2) determining or obtaining the global productivity index (GPI™), which is the ratio of (a) the sum of productivity indices of all producers post project deployment, stbpd/psi ($\Sigma J_{New}$) and (b) the sum of productivity indices of all producers prior project deployment, stbpd/psi ($\Sigma J_{Old}$), and multiplying the interference factor by the difference between the global productivity index (GPI™) and 1, according to the following equation:

$$\frac{\sum \Delta q_A}{\sum q_{Old}} = C_E \times \left(\frac{\sum J_{New}}{\sum J_{Old}} - 1\right)$$

As discussed above, the interference factor is determined according to the following equation:

$$C_E = \left(1 - \log_{10} \frac{\sum J_{New}}{\sum J_{Old}}\right)$$

c. Recovery Deficiency Indicator™

The Recovery Deficiency Indicator™ (RDI™) is a new leading indicator and metric that is designed to quickly assess the potential for increases in petroleum recovery from a reservoir. As noted above, the RDI™ may form part of the RMR™ analysis. A more detailed description of RDI™ is disclosed in U.S. Provisional Application No. 61/101,008, which was filed Sep. 29, 2008, and entitled "ASSESSING PETROLEUM RESERVOIR RESERVES AND POTENTIAL FOR INCREASE", the disclosure of which is incorporated by specific reference. The RDI™ is determined by taking the ratio of a reservoir's recovery efficiency (RE), or recovery factor, and its ideal recovery factor (IRE). This is represented as follows:

RDI=RE/IRE

The recovery efficiency (RE) for a given petroleum reservoir is defined as the product of three factors:

RE=$E_A$*$E_V$*$E_D$ where, $E_A$=the areal displacement efficiency, which is the fraction of floodable pore volume area swept by a displacing fluid;

$E_V$=vertical displacement efficiency, which is the fraction of the floodable pore volume in the vertical plane swept by a displacing fluid; and $E_D$=pore displacement efficiency, which is the fraction of oil saturation at the start of injection which is displaced by a displacing fluid in the invaded zone.

The pore displacement efficiency ($E_D$) can be calculated from the following formula:

$E_D$=1−($S_{or}$/(1−$S_{WC}$))

where, $S_{or}$ is defined as residual oil saturation, which can be measured on core plug samples in the lab after being flooded by ten pore volumes of a displacing fluid; and $S_{WC}$ is the water saturation at initial reservoir conditions.

Determination of the ideal recovery efficiency (IRE) for the reservoir is based on the traditional petroleum engineering concept of recovery efficiency (RE), which, as noted above, can be defined as the ratio of the volume of produced oil to the volume of oil initially in place (OIIP). Values or estimates of $E_A$, $E_V$ and $E_D$ can be determined in the field by operating existing observation wells or by drilling and logging new wells in swept areas of the reservoir. However, production experience in very long-lived oil reservoirs in the Middle East and East Texas indicate that values of $E_A$ and $E_V$ can reach 100%, especially using modern extraction technologies (e.g., drilling, completion, formation evaluation, reservoir simulation, etc.). The ideal reservoir efficiency can be derived from the reservoir efficiency by assuming that both $E_A$ and $E_V$ are equal to 100%. By assuming an ideal volumetric sweep, the IRE equation is simplified to just a determination of $E_D$. In other words, the ideal recovery efficiency for a given petroleum reservoir can be denoted by the equation:

$$IRE=E_D.$$

Reservoir deficiency indicator (RDI™) values can be broken into five ranges or reservoir deficiency scores ("RDS"), which can be used to evaluate and highlight degrees of non-conformance and potential actions that can be taken to correct the shortfall in actual recovery compared to ideal recovery. According to one example, the reservoir deficiency scores can be tabulated as shown in Table 24 below:

TABLE 24

| RDI range (%) | RDS | Action |
| --- | --- | --- |
| 100-90 | A | Small opportunity for improvement |
| 90-80 | B | Can be marginally improved |
| 80-60 | C | Can be improved |
| 60-40 | D | Can be significantly improved |
| <40 | F | Requires total revision |

According to one embodiment, an exemplary process for determining the recovery deficiency indicator (RDI™) and corresponding reservoir deficiency score (RDS) for a producing field or reservoir comprises: (1) determining or obtaining the areal displacement efficiency ($E_A$); (2) determining or obtaining the vertical displacement efficiency ($E_V$); (3) determining or obtaining the pore displacement efficiency ($E_D$); (4) determining the recovery efficiency (RE) based on the areal displacement efficiency ($E_A$), vertical displacement efficiency, and the pore displacement efficiency; (5) determining the ideal recovery efficiency (IRE) by assuming that the areal displacement efficiency ($E_A$) and vertical displacement efficiency ($E_V$) are 100% and setting IRE=$E_D$; (6) determining the recovery deficiency indicator (RDI™) by determining the ratio between the recovery efficiency (RE) and ideal recovery efficiency (IRE); and (7) assigning a reservoir deficiency score (RDS) based on the recovery deficiency indicator (RDI™). All or part of the foregoing process may be implemented using a conventional computer system comprised of one or more processors, volatile system memory, non-volatile system memory or storage, and one or more input-output devices.

Recovery deficiency indicators that are very high may indicate a highly efficiently operated reservoir with well implemented recovery techniques and strategies. On the other hand, scores that are very low indicate significant room for improvement, translating into higher ultimate recovery and potential reserves. Scores that exceed 100%, or which are unrealistically close to 100%, may be evidence of fraud on the part of the reservoir owner.

8. Q6 Surveys

At least some of the information that is used to assess reservoir competency is gathered using Q6 surveys. The following are exemplary Q6 survey questions that can be answered by the reservoir owner or manager in order to help asses reservoir competency.

How is reservoir management implemented?
  ○ As an organization
  ○ As a process
  ○ No recognition, or formal implementation
How is reservoir management valued?
  ○ High
  ○ Medium
  ○ Low
What disciplines comprise the Asset Team?
  ○ Reservoir engineers
  ○ Production engineers
  ○ Drilling engineers
  ○ Operations
  ○ Earth scientists
  ○ Petrophysicists
  ○ Technicians
  ○ Business Development
  ○ Other
How would you describe reservoir management guidelines?
  ○ Documented and well-defined
  ○ Documented
  ○ Not documented and poorly defined
How would you describe reservoir management best practices?
  ○ Documented and well-defined
  ○ Documented
  ○ Not documented and poorly defined
How would you describe the reservoir development/depletion plan?
  ○ Documented and well-defined
  ○ Documented
  ○ Not documented and poorly defined
How often is a Field Review of performance conducted?
  ○ Semi-annually
  ○ Annually
  ○ Whenever necessary
  ○ Never
  ○ Other
What is current annual decline rate in oil production?
  ○ 0%
  ○ 1-10%
  ○ 11-20%
  ○ >20%
In the past five years, how has the reservoir performed according to expectations?
  ○ Exceeded
  ○ Met
  ○ Fell below
What is the primary reason for the decline in oil production?
  ○ Increased water cut
  ○ Increased GOR
  ○ Pressure decline
  ○ Formation damage
  ○ Surface constraints
  ○ Other What is the dominant primary reservoir drive mechanism(s)?
- Pressure Depletion
- Solution Gas Drive
- Gas Cap Expansion
- Edge Water Drive
- Bottom Water Drive
- Compaction
- Other If a gas cap is present, what is its origin?
- Primary
- Secondary
- Gas Re-Injection What is the dominant force affecting current reservoir performance?
- Gravity
- Viscous
- Capillary Is there a pressure maintenance program in place?
- Water injection
- Gas re-injection
- Nitrogen injection
- WAG
- Other What is the injection pattern?
- Peripheral
- Five spot
- Nine spot
- Line drive
- Other Overall, how would you describe displacement direction?
- Side-to-side
- Bottom-up
- Top-down
- Other What is the reservoir's annual voidage-replacement ratio (annual RB injection/RB production)?
- <1
- 1-2
- >2

What is the oil-water mobility ratio?
- $\leq 1$
- >1

How would you describe areal sweep?
- Even
- Dominated by local heterogeneities (e.g., fracture swarms)
- Prone to cusping What is the current areal sweep efficiency behind the flood front?
- >90%
- 70-90%
- 50-70%
- <50%
- Don't know How would you describe vertical sweep?
- Flat
- Prone to fingering (e.g., water over oil)
- Prone to coning What is the current vertical sweep efficiency behind the flood front?
- >90%
- 70-90%
- 50-70%
- <50%
- Don't know How would you describe the reservoir's propensity for water/oil coning?
- High
- Moderate
- Low How would you describe the reservoir's propensity for gas/oil coning?
- High
- Moderate
- Low How would you describe waterflood efficiency?
- High
- Medium
- Low What methods are employed to manage high water/gas producing wells?
- Choke-back at surface
- Shut-in
- Plugback
- Sidetrack
- Adjust sliding sleeve
- Other
- None What percent of producers is channelling behind the pipe a problem?
- 0%
- 1-5%
- 5-10%
- 10-20
- >20%

What is the Maximum-Efficient-Rate (MER) for the reservoir (annual rate/reserves)?
- <2%
- 2-5%
- >5%

How is reservoir performance assessed?
- Key Performance Indicator's (KPI's)
- Comparisons with analogous reservoirs
- Comparisons with simulation predictions
- Other What are the challenges to maintaining production goals?
- Drilling sufficient wells
- Increasing facilities capacities
- Implementing new technologies
- Other In the past five years, how would you describe overall reservoir performance?
- Improved
- Declined
- Remained the same Who does the reservoir performance modeling?
- In-house
- Vendor What is the dominant displacement force being modeled?
- Gravity
- Viscous
- Capillary What types of reservoir performance model(s) are being used?
- Finite difference
- Stream-line
- Material Balance
- Other
- None For finite difference model(s), what options were utilized?
- Black Oil
- Compositional

- Thermal
- Dual Porosity
- Dual Permeability

What is the primary use(s) for the models(s)?
- Development
- Operations
- Recovery Who is involved in the history matching process?
- Simulation engineer
- Reservoir engineer
- Earth scientists
- Other What were the design parameters for field development?
- Depletion/production rate
- Drawdown
- Well density
- Number of wells
- Injection pattern
- Type of injection fluid
- Well completion geometries
- Reservoir pressure
- Recovery
- Other How was risk and uncertainty captured in optimizing the oil production rate?
- Deterministic sensitivity studies
- Conducted Monte Carlo simulation studies through experimental design
- Other
- Not captured What aspects of the model predictions are consistent with performance data?
- Field scale oil, water and gas production rates
- Field scale reservoir pressure
- Well scale oil, water and gas production rates (>75% match)
- Well scale reservoir pressure
- Layer scale pressure
- Layer scale saturation What reserve accounting standard is utilized by the company?
- Post 2007 SPE et al.
- Pre 2007 SPE et al.
- U.S. Security Exchange Commission
- In-house
- Other How are the company's reserves validated?
- In-house audit
- Outside third party audit
- None Who has the responsibility of reporting reserves?
- Petroleum Engineering
- Exploration
- Corporate Planning
- Other What types of methods have been used to book reserves?
- Deterministic
- Probabilistic How are reserves calculated?
- Decline curve
- Simulation
- Material Balance
- Mapping OIIP combined with recovery factor
- Analogy
- Other In the past five years how have proved/P1 reserves changed?
- Increased
- Decreased
- Stayed the same What are the challenges to maintaining ultimate recovery targets?
- Drilling sufficient wells
- Increasing facility capacities
- Implementing new technologies
- Other What is the expected areal sweet efficiency at floodout?
- >90%
- 70-90%
- 50-70%
- <50%
- Don't know What is the expected vertical sweep efficiency at floodout?
- >90%
- 70-90%
- 50-70%
- <50%
- Don't know What log based measurements of remaining oil saturation have been run in well-swept portions of the reservoir?
- Log-Inject-Log
- PNL
- NMR
- DIL/DLL
- Tracer
- Other What specialized coring programs were employed in determining remaining oil saturation?
- Sponge
- Pressure
- Sidewall How was the theoretical remaining oil saturation to water determined?
- Lab experiments
- Field observations
- Analogy For the determination of water/oil relative permeabilities, which types of lab experiments were most relied upon?
- Steady state waterfloods
- Unsteady state waterfloords
- Centrifuge know tests How was the theoretical remaining oil saturation to gas determined?
- Lab experiments
- Field observations
- Analogy For the determination of gas/oil lab permeabilities, which types of lab experiments were most relied upon?
- Steady state gasflood
- Unsteady state gasflood
- Centrifuge hog tests III. Implementation of RCAA™

A detailed description of RCAA™ is attached as an appendix to U.S. Provisional Application No. 61/031,167 filed Feb. 25, 2008, and entitled "METHOD FOR DYNAMICALLY ASSESSING PETROLEUM RESERVOIR COMPETENCY THROUGH ASYMMETRIC ANALYSIS OF PERFORMANCE METRICS," the disclosure of which is incorporated herein in its entirety including the appendix thereto (hereinafter referred to as "RCAA document"). The RCAA document includes various sections, including an executive overview and a client SME (subject matter expert) workbook. The executive overview briefly describes the RCAA™ and what it seeks to accomplish and includes subsections relating to the preamble, QRI® (Quantum Reservoir Impact) reservoir management model, principal focus areas, and gap analysis. The client SME workbook includes subsections relating to Q6 surveys, knowledge systems, deep insight workshops, Q-diagnostics, gap analysis, and plan of action (see FIG. 1). The various pieces of RCAA™ interact together in a synergistic manner in order to maximize the ability knowledgably increase reservoir productivity (i.e., production and reserves).

In addition to direct measurements of the metrics described herein, exemplary methods for gathering formation may include knowledge systems, Q6 surveys, and deep insight workshops to ensure that all the relevant information is obtained. In many cases, the relevant information can be gathered in as little as 72 hours or as much as 180 days. A typical case may take about 90 days to accumulate the relevant information regarding the current state of affairs of a reservoir.

Examples of the knowledge pool used to gather information relating to a specific reservoir includes production and drilling data, core and PVT lab testing, special analysis testing, well construction, well design, geophysics, petrophysics, geology, selective and monitored field trials, and reservoir data.

Continuous monitoring of certain metrics can be provided by "dashboards" which provide real time display of various metrics. A dashboard can provide instant monitoring of many dynamically changing variables at once. They may include triggers or alarms, such as maxima or minima which, when met, may require affirmative steps to alter how production is being carried. These include, for example, closing or opening valves in the well bore, choking or increasing flow rate by adjusting impellers, activating or altering pumps to increase flow rate, making perforations in the pipe to begin removing oil in certain locations in the bore, and stimulation of existing wells, such as by fracking or acidization, to increase the amount of rock through which oil flows.

A. Assessing Reservoir Competency

According to one embodiment consistent RCAA™, there is provided a method of assessing the competency of a petroleum reservoir relative to production and recovery for purposes of initiating a plan of action to increase production and/or recovery, the method comprising: 1) establishing a plurality of reservoir performance metrics that relate to the production and recovery of petroleum from the reservoir; 2) weighting one or more of the reservoir performance metrics more heavily than at least one other of the reservoir performance metrics to facilitate asymmetric analysis of the reservoir performance metrics; 3) obtaining data relating to the reservoir performance metrics, the data being generated by at least one of (i) measuring a physical property of one or more producing oil wells and/or injector wells of the reservoir, (ii) taking and analyzing one or more core samples from the reservoir, or (iii) establishing a relationship between one or more different types of data from (i) or (ii); 4) generating the reservoir performance metrics from the data; and 5) determining a competency rating for the petroleum reservoir based on asymmetric analysis of the reservoir performance metrics, the competency rating relating to at least one of production or recovery of petroleum from the reservoir.

According to one embodiment, the data relating to the reservoir performance metrics are input into a computer, which then analyzes and displays the data in one or more forms, such as spreadsheets and tables (e.g., as illustrated in FIGS. 5-10). The displayed data can be used to assess reservoir competency. In general, the worse an existing reservoir is currently being managed and operated, the more gains can be made through implementation of the RCAA™ methodology.

The metrics that are most important in assessing reservoir competency include the leading indicators described above. Examples of useful leading indicators include dead well index, dead well gradient, gas oil ratio, gas oil ratio gradient, reservoir pressure change, oil decline rate, oil decline rate gradient, waterflood efficiency, waterflood efficiency gradient, recovery deficiency indicator, or production gain index. Less useful, but certainly within the scope of RCAA™ to utilize are lagging indicators. Examples of useful lagging indicators include average producer liquid rates, oil rate, water rate, depletion rate, expected ultimate recovery depletion rate, 1P depletion rate, depletion state, expected ultimate recovery depletion state, mobile oil initially in place depletion state, dimensionless pressure drawdown, dimensionless productivity index, dimensionless injectivity index, gas rate, liquid rate, maximum efficient rate, pressure gradient, productivity index gradient, rate restrictions, dimensionless rate restrictions, recovery efficiency, oil recovery factor, mobile oil depletion efficiency, theoretical maximum recovery efficiency, transmissibility index, voidage replacement ratio, surface voidage replacement ratio, reservoir voidage replacement ratio.

Other useful metrics for assessing the competency of a petroleum reservoir include unit development metrics, workload metrics, business plan metrics, and stretch goals.

According to one embodiment, metrics can be selected and weighted according to what is described in the section above relating to RMR™. In general, the asymmetric assessment of reservoir competency helps to understand the specific DNA or state of affairs of the reservoir, which provides insight as to how a plan of action to increase productivity and recovery is to be designed. As more information is learned regarding the reservoir, other metrics may become more or less important to the analysis. The RCAA™ allows for distillation of the data. It takes a complex picture that may be meaningless and distills it to a very clear picture. This helps develop a more intelligent and successful plan of action, and provides a tool for executing the plan of action. It acts as a continual guide to the organization.

According to one embodiment, principles relating to "Six Sigma" ($6\Sigma$) can be applied to aspects of the reservoir subsurface. The purpose of $6\Sigma$ is to identify outliers that are far outside the mean, such as oil producing wells. In many cases, outliers may simply be bad apples suitable for shutdown. However, the outliers might in some cases be the most highly productive oil wells of a reservoir. They might point to the ideal and form the basis for duplication by other oil wells or provide information regarding favorable subsurface conditions in the vicinity of the outlier oil wells. Outliers might be identified, for example, using a productivity gradient metric that compares oil well productivity across the entire reservoir.

According to one embodiment, a method for assessing the competency of a petroleum reservoir involves determining a reservoir management rating by asymmetrically weighting performance metrics relating to the following categories: reservoir management design, reserves appreciation, development and operating plan, reservoir surveillance, technology application, and knowledge management. The performance metrics relating to reservoir management design including recovery design, field depletion rate, well rate/drawdown, displacement process risk, and plateau sustainability. The performance metrics relating to reserves appreciation including oil OIIP/GIIP verification, sweep efficiency, displacement efficiency, reserves verification, and risk mitigation. The performance metrics relating to development and operating plan including production plan achievement, field productivity, pressure management, gas management, water management, and drawdown management. The performance metrics relating to reservoir surveillance including master plan design and master plan implementation. The performance metrics relating to technology application including drilling technology, completion technology, stimulation technology, and reservoir dynamics technology. The performance metric relating to knowledge management including knowledge management index. According to one embodiment, the forgoing performance metrics are weighted according to the following weighting criteria: reservoir management design≈reserves appreciation>development and operating plan>technology application>reservoir surveillance>knowledge management.

Other major factors that may affect or determine reservoir competency include, for example, factors that involve PGI, such as the level of reservoir contact, formation damage upon completion of a well, and the diameter of the bore. Factors that affect whether there may be formation damage include, for example, the type of rock, drilling velocity, and pressure balance during drilling (e.g., over balance might cause formation damage, which under balance might cause a blow out). For example, safe operation of the drilling equipment might require 500 pounds of overburden. However, higher overburden might cause damage by pushing mud into the well. This, in turn, might prevent obtaining a good flow rate through the well. Remedies to low PI may include, for example, one or more of an acid job, acid frack (i.e., fracture), high pressure frack, and washing with water.

Other factors that may affect or determine reservoir competency include, for example, factors that involve RDI, such as aerial sweep, vertical sweep, displacement efficiency, pore throat, and lithology. These mainly help in gap analysis, which asses the difference between the producer's goals and current production and recovery.

In addition, external factors may affect which metrics are most important. These include economic factors (i.e., what is the time horizon of the owner in terms of dollars spent versus dollars earned from an enhanced recovery plan using RCAA™. Another type of external factor includes risk factors. In general, risk factors can be mitigated by properly designing a recovery plan.

B. Developing Plan of Action

A plan of action according to RCAA™ is formulated based on the properly gathered, analyzed and weighted data for a particular reservoir. The plan of action constitutes a comprehensive road map with details regarding agreed upon metrics and key performance indicators. Because the plan of action is based on an accurate assessment of the short-, mid- and long-term condition of the reservoir and is tailored to the specific conditions of the reservoir and/or needs of the producer, the plan of action is far more likely to succeed and result in increased short-, mid- and/or long-term production and profits compared to what is possible using conventional methods.

According to one embodiment, designing a plan to increase productivity and/or recovery involves obtaining data from the diagnosis step described above and working with the producer to understand the benefits and limits of one or more possible plans of action. The use of RMR™, for example, will help develop of a rating system that permits a producer to intelligently assess a desirable plan of action. Workshops may be employed to test out different plans of action to determine what works best given the goals of the producer.

There is generally a tradeoff between long-term and short-term horizons or goals. For example, if a producer has a short-term horizon, such as may occur if capital is limited (e.g., based on the size of the company, the investors, and/or lenders), the producer may be content with providing a lower initial investment in improving reservoir competency, which will generally increase the initial return of investment but at the cost of reducing long-term production and ultimate recovery. Later increases in long-term production and recovery will generally cost more in the long run when taking this approach. Conversely, a producer having a longer-term horizon may be willing to providing a higher initial investment in improving reservoir competency. This generally decreases the initial return of investment but increases long-term productivity and recovery, which results in a reduction in total expenditure to maximize productivity and recovery.

According to one embodiment, a method of designing a plan of action for increasing production and recovery of petroleum from a petroleum reservoir comprises: 1) performing asymmetric analysis of the petroleum reservoir to determine reservoir competency, the asymmetric analysis being performed by weighting one or more reservoir performance metrics more heavily than at least one other reservoir performance metric; 2) establishing at least one of a desired depletion rate or a desired production rate and ultimate recovery for the petroleum reservoir; 3) building a replica of the petroleum reservoir that defines location of petroleum in the reservoir, including at least one of connectivity or disconnectivity of oil within the reservoir, potential flow paths of the petroleum as a result of extracting oil from the reservoir as a result of natural flow rates and/or fluid pressures in the reservoir and/or injection of ancillary fluids in the reservoir; and 4) designing a plan of action that includes production architecture relating to i) producing oil wells, including the number, location and how they are designed and operated, ii) injection of ancillary fluids (e.g., water and/or gas) to help drive oil toward the producing wells, including the placement of one or more injector wells and volume of ancillary fluids injected through one or more injector wells, and optionally iii) stimulation of one or more existing producing wells to increase productivity (e.g., so as to remove blockage and/or increase flow rate through rock).

According to one embodiment, performing asymmetric analysis of the petroleum reservoir to determine reservoir competency includes determining a reservoir management rating for the petroleum reservoir, the reservoir management rating being determined by asymmetrically weighting performance metrics relating to the following categories: reservoir management design, reserves appreciation, development and operating plan, reservoir surveillance, technology application, and knowledge management. At least one of performing asymmetric analysis, establishing a desired production rate and ultimate recovery, building a replica of the petroleum reservoir, or designing a plan of action is carried out by means of a computer system having a processor and system memory and displaying information relating petroleum reservoir.

According to one embodiment, generating the replica of the petroleum reservoir is performed at least in part by a computer system, the replica of the petroleum reservoir comprising at least one of a numerical model or a visual display of some portion or all of the petroleum reservoir.

The method of designing a plan of action may further comprise designing architecture relating to the ancillary fluids including separation of the ancillary fluids from petroleum extracted from the reservoir and processing of the ancillary fluids. For example, the architecture relating to the ancillary fluids including at least one of disposal, reinjection or sale of the ancillary fluids.

Figure 11:
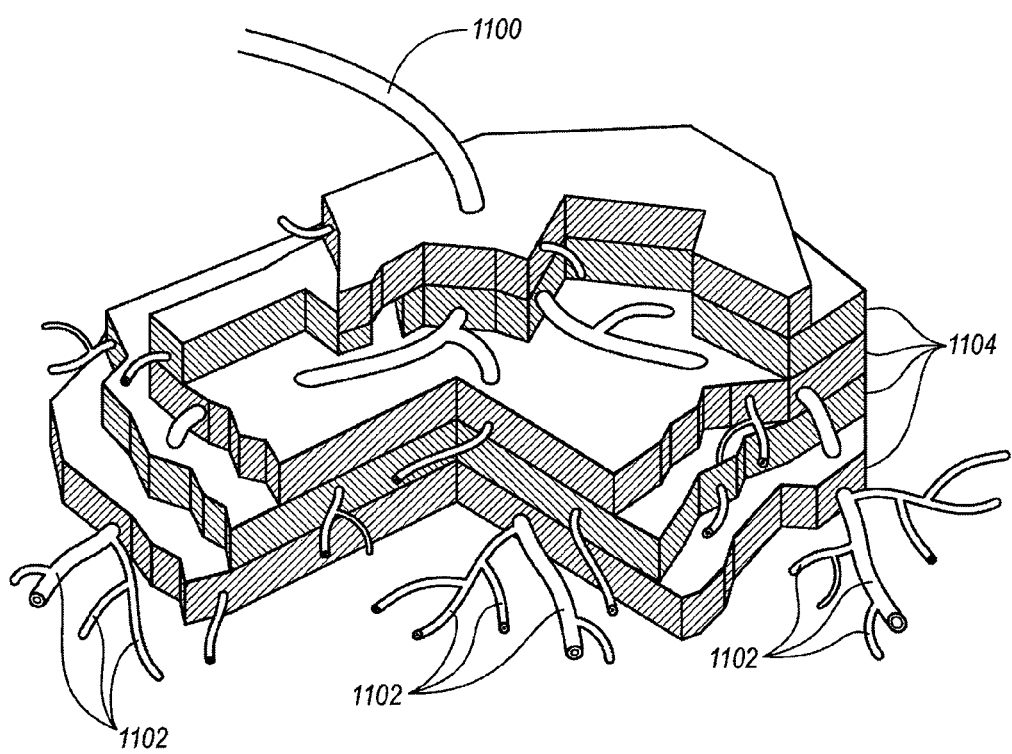
FIG. 11 illustrates an exemplary maximum reservoir contact (MRC) well used to increase productivity of a single producing oil well.

As discussed above, establishing a desired production rate and ultimate recovery for the petroleum reservoir generally considers how much a producer wishes to invest in increasing production and recovery of petroleum from the reservoir. To maximize both production and long term productivity, the plan of action or production architecture includes design and placement of at least one maximum contact well having a plurality of branched, at least partially horizontal well bores. This type of well is known as a "maximum reservoir contact" (MRC) well. An exemplary MRC well is illustrated in FIG. 11, and includes a multiple branched well bore 1100, including a pluarality of spaced-apart well bore subsections 1102 that extended generally horizonatally through one or more strata 1104 of the reservoir. The well bore subsections 1102 may also be positioned vertically relative to each other in order to better drain oil found at different reservoir depths. In general, an MRC well is used to better drain oil pockets that are generally fluidly interconnected.

C. Implementing the Plan of Action

Another aspect of RCAA™ is implementation of the plan of action formulated based on the properly gathered, analyzed and weighted data for a particular reservoir. According to one embodiment, the plan of action is designed in consideration of the RMR™ and to increase productivity and/or recovery from the reservoir.

According to one embodiment, there is provided a method of implementing a plan of action for increasing production and recovery of petroleum from a petroleum reservoir, the method comprising: 1) obtaining a plan of action designed using asymmetric analysis of the petroleum reservoir to determine reservoir competency, the asymmetric analysis being performed by weighting one or more reservoir performance metrics more heavily than at least one other reservoir performance metric, the plan of action including production architecture relating to i) new producing oil wells, including the number, location and how they are designed, ii) injection of ancillary fluids to help drive oil in the reservoir toward the producing wells, including the placement of one or more injector wells and volume of ancillary fluids injected through one or more injector wells, and optionally iii) stimulation of one or more existing producing wells to increase productivity; 2) placing new producing oil wells in locations at the petroleum reservoir and constructing the new producing oil wells according to the plan of action; and 3) placing injector wells in locations at the petroleum reservoir according to the plan of action in order to help drive oil in the reservoir toward the new producing oil wells and optionally toward pre-existing oil wells of the petroleum reservoir.

According to one embodiment, when implementing the plan of action the new producing oil wells are constructed so as to include one or more subsurface production control devices selected from the group consisting of down hole valves, down hole flow devices, impellers, choking devices, down hole submersible pumps, separation devices to pack or seal off a portion of the petroleum reservoir, and perforations in well pipe to increase reservoir contact area.

According to one embodiment, at least one of the new producing oil wells is constructed as a maximum reservoir contact well having a plurality of branched and at least partially horizontal well bores (See FIG. 11). The new producing oil wells may also be constructed to as to include well pipe perforations, with the number and direction of the perforations being in accordance with the plan of action.

According to one embodiment, implementing the plan of action further comprises redesigning the interior of one or more pre-existing oil wells in order to increase reservoir contact area and thereby increase well productivity.

Implementing the plan of action may also include placing injector wells and designing the volume of ancillary fluids injected through the injectors so as to be in accordance with the plan of action. Implementing the plan of action may further include constructing and/or placing equipment for separating the ancillary fluids from petroleum extracted from the reservoir and processing the ancillary fluids.

Implementing the plan of action may further including stimulating one or more existing oil wells to increase productivity, such as by at least one of high pressure fracking, acid fracking, or acid washing. In addition, or alternatively, implementing the plan of action may include shutting down one or more pre-existing oil wells so as to alter flow of petroleum through the reservoir in a manner that ultimately drains more oil from the reservoir than if the pre-existing oil wells were not shut down.

D. Tracking and Performance

Another aspect of RCAA™ is monitoring and tracking the performance of a petroleum reservoir, such as one designed or improved according to RCAA™. Again, proper monitoring and tracking of reservoir performance may be highly dependent on properly gathering, analyzing and weighting data relating to the reservoir. In general, leading indicators are better able to help predict future adverse events, and provide the ability to resolve or remedy such events, than lagging indicators.

According to one embodiment, there is provided a computer implemented method of monitoring and tracking reservoir performance relative to at least one of production or recovery, the method comprising: 1) taking or receiving measurements relating to oil well performance at a petroleum reservoir and inputting the measurements into a computer system having a processor and system memory; 2) the computer system relating the measurements to performance metrics, at least some of which are leading indicators of oil well performance; 3) the computer system comparing at least some of the measurements and/or performance metrics relating to oil well performance to predetermined alarm levels or triggers; and 4) upon a measurement or performance metric exceeding an alarm level or trigger point by falling below a minimum or exceeding a maximum, the computer system performing at least one of i) altering at least one production parameter by an oil well or ii) alerting a reservoir manager, owner and/or third party that an alarm level or trigger point has been exceeded. The computer system may also display information relating to at least one measurement and/or performance metric relating to oil well performance, such as graphically and/or so as to appear as a dial (e.g., FIGS. 3A-3D).

According to one embodiment, exceeding an alarm level or trigger point may result in or require at least one of increasing or reducing oil production by one or more oil wells of the reservoir. Alternatively or in addition, exceeding an alarm level or trigger point may result in or require at least one of increasing or reducing oil production by putting one or more new oil wells into production at the reservoir or stopping production by one or more oil wells.

According to one embodiment, exceeding an alarm level or trigger point may result in or require at least one of increasing or reducing ancillary fluid injection into the reservoir. Alternatively or in addition, exceeding an alarm level or trigger point may result in or require stimulation of at least one oil well to increase well productivity.

IV. Examples

The following examples are provided to illustrate how the RCAA™ methodology has been used in the field to increase productivity and/or recovery of an existing reservoir. None of the reservoirs described in the examples are located in the United States, and none of the acts used to improve productivity and/or recovery were carried out in the United States. Moreover, neither the RCAA™ methodology nor the underlying acts used in connection with the examples were publicly known.

EXAMPLE 1

Background Information

The field in this example has been on production under a peripheral waterflood. It is in a mature state of depletion with more than 70% of its reserves already produced. Re-engineering efforts were initiated to reduce field decline rates and water-cuts. A secondary objective was to lower ESP requirements and associated capital programs.

Geology

The field produces from a 60+ meters thick carbonate reservoir which is comprised of numerous shoaling-upwards cycles. The reservoir has an average porosity of more than 15% and permeability up to several darcies. The upper half of the reservoir is generally very high reservoir quality; the lower half contains numerous interbeds of high and low reservoir quality. The lower half reservoir quality is enhanced by the addition of fracture permeability which significantly increases reservoir conductivity while also increasing risks of premature water breakthrough. The reservoir has more than 300 meters of structural closure and a weak initial edge-water drive which was replaced with a peripheral waterflood.

RCAA™ Impact

Gap analysis and knowledge systems in the form of well ranking were employed to recognize deficiencies in the prior depletion plan and provide direction as to remedies. The subject reservoir was undergoing peripheral water flooding with the objective of cycling as much water as possible to maximize ultimate recovery. Provided this objective, the operator produced the down-dip front-row producers at high rates and water cuts. As a result of this plan the up-dip producers suffered from low pressures which lead to a high dead well count and diminished up-dip oil potential. In effect, the operator was trying to impose a viscous dominated recovery model on a gravity dominated system. Solutions to this problem included employing a unified water management plan of individual producers coupled with the use of horizontal geometries for new wells and workovers.

In 1999, the average well rate was expected to decline at 10% per year and the water-cut would about double over the next 7 years. With the deployment of the improved depletion plan the average well rate and field water cut instead stabilized over this time. Moreover, oil potential increased 128,000 Bbls/day, 69 dead wells were revived, and 60 ESP's cancelled.

EXAMPLE 2

Background Information

The field in this example went on-stream in 2006 with a production rate of 300,000 Bbls/day and was the third increment of a three-increment field development plan. It is under a peripheral waterflood. Re-engineering efforts in designing the new production increment were initiated due to concern about premature water breakthrough, excessive development costs and high well decline rates, all due to complex geology. These concerns were based on experience gained through the development and performance of two adjacent oil-containing increments.

Geology

The field produces from a 60 meter thick carbonate reservoir which is comprised of numerous shoaling-upwards cycles. The reservoir has an average porosity of about 15% and permeability up to 100 millidarcies. The upper half of the reservoir is generally moderate reservoir quality; the lower half contains numerous interbeds of moderate and low reservoir quality. The reservoir quality is enhanced by the addition of fracture permeability which significantly aids in the recovery process. The reservoir has more than 250 meters of structural closure and a weak initial edge-water drive which was replaced with a peripheral waterflood.

RCAA™ Impact

Prior to the development of the third increment, the first increment was developed using vertical wells and the second increment utilized short horizontals. While horizontal wells were an improvement over verticals, both configurations suffered from relatively low productivity indexes (PIs), which resulted in the wells dying at lower water cuts. Usually, this action created the need for more drilling and ESPs to maintain rate. In order to realize the lessons learned from the first and second increments and to recognize best practices, interdisciplinary workshops and surveys were performed. The workshops brought into consideration new reservoir physical models, which in turn produced recommendation on the best technologies and methodologies to leverage those models. Ultimately, this activity led to the design and use of advanced well architecture, downhole monitoring and control, and I-Fields.

The field came successfully on-stream 5 months ahead of schedule and fully in line with planned production targets (300,000 Bbls/day). The reservoir performance to date has been exceptionally good in terms of sustained well productivities, actual water-cuts and average reservoir pressures. Key factors in ensuring the success of this project were: 1) well architecture designs and completions based on new technologies; 2) state-of-the-art real-time field monitoring (I-Field); and 3) overall field development and peripheral waterflood designs.

EXAMPLE 3

Background Information

The field in this example came on production in 1998 at a production rate of 500,000 Bbls/day. It was developed exclusively by 1-kilometer long horizontal wells. Current plans call for increasing production to 750,000 Bbls/day by 2010. Re-engineering efforts were initiated to reduce well productivity declines, gas oil ratio (GOR), and associated field development capital and operational costs.

Geology

The field is characterized as a gently folded northeast/southwest-trending anticline consisting primarily of Cretaceous age sandstones, shales, and carbonates. The reservoir consists of rudist buildups that vary laterally into barrier and shelf slope facies. While matrix porosity is generally high (with an average of 25%) and does not vary laterally, permeability is facies-dependent and exhibits spatial variability. In the south which is dominated by low-energy lagoon deposits, typical permeabilities range from 5 to 10 millidarcies. 3D seismic data show that the reservoir contains a number of faults. These faults and fractures have been identified from open hole logs and are most prevalent in the northern part of the reservoir and can enhance reservoir quality where they occur. Because the reservoir depletion mechanism is primarily gas cap expansion, this also increases the risk of gas coning.

RCAA™ Impact

The field was initially developed with 120 horizontal wells to produce 500,000 Bbls/day. The field declined at a higher rate than expected. An in-depth review indicated that a large number of wells would have to be drilled to maintain the rate. A gap analysis revealed that the wells needed a higher productivity Index (PI). Knowledge systems in the form of well ranking showed that wells located in the certain areas of the field were producing below expectations. These areas were determined to have low permeabilities.

Diagnostic plots of PI versus well length revealed a correlation that suggested longer wells produced more oil. A series of reservoir and drilling reviews were run that revealed it would be possible to drill significantly longer and more complex wells. This led to the concept of Maximum Reservoir Contact (MRC) wells. MRC wells are characterized as being highly branched, with multiple pipes going in various directions through different horizontal and vertical regions of the reservoir. This design helps drain more of the oil from the reservoir, both in the short term and also long-term, boosting both production and recovery. The higher PI in MRC resolves several problems: 1: offsets low rates in the tight facies; 2) prevents or inhibits gas coning; and 3) reduces the number of wells that would otherwise be required to increase production and recovery to the desired level. As a result, the first MRC wells were drilled. These wells successfully reduced the decline, stopped gas coning, and increased average well rate by a factor of six.

The field's performance was dramatically improved and projected capital expenses were reduced. This ultimately led to plans to increase the production rate. The key factors in the successful re-engineering program were: 1) well architecture designs and completions based on new technologies; and 2) comprehensive reservoir monitoring programs.

EXAMPLE 4

Background Information

The reservoir in this example has been on production for more than 50 years and is in an advanced state of depletion, with more than 85% of its reserves already produced. The main production drive is from a peripheral waterflood. Re-engineering efforts were initiated to reduce declines in well productivities and rapidly increasing water-cuts. A secondary objective was to lower ESP requirements and associated capital costs.

Geology

The field produces from a 60+ meters thick carbonate reservoir which is comprised of numerous shoaling-upwards cycles. The reservoir has an average porosity of more than 15% and permeability up to several darcies. The upper half is generally very high reservoir quality; the lower half contains numerous interbeds of high and low reservoir quality. The remaining reserves in the field are largely in a thin oil column below a secondary gas cap and in a low permeability facies in the top-most layer located in the northern half of the field. The reservoir has more than 300 meters of structural closure and a weak initial edge-water drive which was replaced with a peripheral waterflood.

RCAA™ Impact

It was estimated by the operator that to recover the remaining oil contained in a thin oil column, several hundred vertical wells completed in the low permeability upper portion of the reservoir and equipped with ESP's would be required. However, a gap analysis recognized the current paradigm of the reservoir did not support actual performance. It revealed that coning and low well PI were detriments to recovering the remaining oil under the then-current depletion plan. As an integral part of the process, various diagnostic well plots were created from simulation that indicated the advantages of increasing reservoir contact. As a result of a series of workshops, shared ideas coalesced into a new understanding of the reservoir. This improved understanding of reservoir mechanics led to the placement of MRC wells structurally high in the upper-most zone, which resulted in the stabilization of field oil rate and water-cut. A resulting diagnostic plot of unit cost comparison succinctly captured the prime advantage of the strategy in that it provided a 15 fold decrease in development cost when MRC's are compared to vertical completions.

The field's production was drastically improved in terms of well decline rates, new well productivities and overall water-cuts. Substantial savings were achieved from deferral of ESP installations. The main factors in achieving successful results were: 1) designing new and very effective well architecture designs and completions; 2) redesigning workover programs; and 3) modifying production/injection allocations of the peripheral waterflood.

EXAMPLE 5

Background Information

This reservoir has been on production for more than 30 years. It benefits from a dual drive mechanism; an over lying gas cap and an underlying active aquifer system. It is in a mature state of depletion. Re-engineering efforts were initiated to improve the productivity of wells in an increasingly challenging development environment that involved high drilling costs, shrinking oil target window, reservoir heterogeneity and limitations on water and gas handling facilities.

Geology

The field produces from a 100 meter thick sandstone reservoir deposited in a fluvio-marine environment. The reservoir consists of a lower main sand and an upper stringer sands interval. It has an average porosity of more than 20% and permeability up to several darcies. The lower half of the reservoir is very high quality; the upper half contains meandering channels of high quality, but limited continuity. Most of the reserves recovered to date are from the easy to produce main sand; the majority of the remaining reserves reside in the difficult to locate, upper stringer sands.

RCAA™ Impact

The oil column was decreasing in the better portions of the reservoir due to the long term production. This required development in poorer sections of the reservoir. Gap analysis revealed that previous development schemes could not be used because the lower quality reservoir was discontinuous and had lower average PI. Gap analysis additionally revealed that locating the stringer sands was more difficult than expected. Well ranking revealed that the wells drilled in the upper stringer sands were going wet and drying sooner than predicted. By identifying the location of the poorer performing wells, a correlation was made between well standoff and performance.

During reservoir and geologic reviews, it was discovered that reprocessing the 3-D Seismic data for AVA analysis might enable the geophysicists to see the stringer sands which heretofore were below the resolution of the seismic data. AVA was able to show where the stringer sands existed and enabled the proper location of wells with the proper stand-off from the fluid contacts. The analysis also led to appropriate application of state-of-the-art completion techniques for this stage of the field's life.

Well productivities were significantly improved in both new and worked-over wells. The main factors for successful results were: 1) improved understanding of sand continuity through advanced seismic processing (AVA); 2) application of state-of-the-art completion techniques; 3) application of geo-steering; and 4) new well architectural designs.

What is claimed is:

1. A method of assessing the competency of a petroleum reservoir relative to production and recovery for purposes of initiating a plan of action to increase production and/or recovery of petroleum from the petroleum reservoir, comprising:
    establishing a plurality of reservoir performance metrics that relate to the production and recovery of petroleum from the reservoir, the performance metrics including one or more leading indicators and one or more lagging indicators;
    weighting one or more of the reservoir performance metrics more heavily than at least one other of the reservoir performance metrics, including weighting at least one of the leading indicators more heavily than at least one of the lagging indicators, to facilitate asymmetric analysis of the reservoir performance metrics;
    obtaining data relating to the reservoir performance metrics for the petroleum reservoir, the data being generated by at least one of (i) measuring a physical property of one or more producing oil wells and/or injector wells of the reservoir, (ii) taking and analyzing one or more core samples from the reservoir, or (iii) establishing a relationship between one or more different types of data from (i) or (ii);
    generating the reservoir performance metrics for the petroleum reservoir from the data; and
    determining a competency rating for the petroleum reservoir based on asymmetric analysis of the reservoir performance metrics, the competency rating relating to at least one of production or recovery of petroleum from the petroleum reservoir.

2. The method of assessing the competency of a petroleum reservoir as in claim 1, the one or more leading indicators being selected from the group consisting of dead well index, dead well gradient, gas oil ratio, gas oil ratio gradient, reservoir pressure change, oil decline rate, oil decline rate gradient, waterflood efficiency, waterflood efficiency gradient, water cut, water cut gradient, recovery deficiency indicator, and production gain index.

3. The method of assessing the competency of a petroleum reservoir as in claim 1, the one or more lagging indicators being selected from the group consisting of average producer liquid rates, oil rate, water rate, depletion rate, expected ultimate recovery depletion rate, 1P depletion rate, depletion state, expected ultimate recovery depletion state, mobile oil initially in place depletion state, dimensionless pressure drawdown, dimensionless productivity index, dimensionless injectivity index, gas rate, liquid rate, maximum efficient rate, oil rate, water rate, pressure gradient, productivity index gradient, rate restrictions, dimensionless rate restrictions, recovery efficiency, oil recovery factor, mobile oil depletion efficiency, theoretical maximum recovery efficiency, transmissibility index, voidage replacement ratio, surface voidage replacement ratio, and reservoir voidage replacement ratio.

4. The method of assessing the competency of a petroleum reservoir as in claim 1, the competency rating for the petroleum reservoir further being determined based on a reservoir management rating for the petroleum reservoir, the reservoir management rating being determined by asymmetrically weighting performance metrics relating to the following categories: reservoir management design, reserves appreciation, development and operating plan, reservoir surveillance, technology application, and knowledge management.

5. The method of assessing the competency of a petroleum reservoir as in claim 4,
    the performance metrics relating to reservoir management design including recovery design, field depletion rate, well rate/drawdown, displacement process risk, and plateau sustainability,
    the performance metrics relating to reserves appreciation including oil OIIP/GIIP verification, sweep efficiency, displacement efficiency, reserves verification, and risk mitigation,
    the performance metrics relating to development and operating plan including production plan achievement, field productivity, pressure management, gas management, water management, and drawdown management,
    the performance metrics relating to reservoir surveillance including master plan design and master plan implementation,
    the performance metrics relating to technology application including drilling technology, completion technology, stimulation technology, and reservoir dynamics technology, and
    the performance metric relating to knowledge management including knowledge management index.

6. The method of assessing the competency of a petroleum reservoir as in claim 4, the performance metrics being weighted according to the following weighting criteria: reservoir management design≈reserves appreciation>development and operating plan>technology application>reservoir surveillance>knowledge management.

7. The method of assessing the competency of a petroleum reservoir as in claim 6, the performance metrics being weighted according to the following weighting factors: weighting factor for reservoir management design is about 25%, weighting factor for reserves appreciation is about 25%, weighting factor for development and operating plan is about 20%, weighting factor for technology application is about 15%, weighting factor for reservoir surveillance is about 10%, and weighting factor for knowledge management is about 5%.

8. The method of assessing the competency of a petroleum reservoir as in claim 1, the method further including establishing one or more other metrics selected from unit development metrics, workload metrics, business plan metrics or stretch goals and determining the competency rating using the one or more other metrics.

9. The method of assessing the competency of a petroleum reservoir as in claim 8,
    the unit development metrics including one or more of cost factor, drilling cost factor, workover cost factor, efficiency factor, drilling efficiency factor, workover efficiency factor, median reservoir contact of producers, or median reservoir contact of injectors;
    the workload metrics including one or more of professional training, number of papers, number of training days, number of in-house courses, number of third party courses, studies, ongoing studies lasting less than twelve months, ongoing studies lasting more than twelve months, simulation, or ongoing lab or field trials of new methods or technologies;
    the business plan metrics including one or more of fluid rate forcast, oil rate forecast for a business planning cycle, water rate forecast for a business planning cycle, or water cut forecast for a business planning cycle; and
    the stretch goals including one or more of historical performance, business plan forecast that considers current rate of implementation of new technologies and best practices, production development cost, voidage replacement ratio, surface voidage replacement ratio, or water cut.

10. The method of assessing the competency of a petroleum reservoir as in claim 1, the method further comprising performing gap analysis by comparing the difference between a producer goal or ideal and current production and/or recovery.

11. The method of assessing the competency of a petroleum reservoir as in claim 1, the competency rating being determined, at least in part, by analyzing at least one of reservoir performance metrics or data relating to the reservoir performance metrics by means of a computer system having a processor and system memory and displaying information relating to the competency rating, the displayed information comprising at least one of a spreadsheet or a graph representative of or devised from performance metrics.

12. The method of assessing the competency of a petroleum reservoir as in claim 1, wherein measuring a physical property of one or more producing oil wells and/or injector wells of the reservoir includes at least one of 1) taking down hole fluid samples of oil, water and gas, 2) measuring pressure using repeat formation tester (RFT) or other devices, or 3) determining fluid saturations from well logs.

13. A method of implementing a plan of action for increasing production and recovery of petroleum from a petroleum reservoir, comprising:
obtaining a plan of action designed using asymmetric analysis of the petroleum reservoir to determine reservoir competency, the asymmetric analysis being performed by weighting one or more reservoir performance metrics more heavily than at least one other reservoir performance metric, including weighting at least one leading indicator more heavily than at least one lagging indicator, the plan of action including production architecture relating to at least one of 1) new producing oil wells, including the number, location and how they are designed, 2) injection of ancillary fluids to help drive oil in the reservoir toward the producing wells, including the placement of one or more injector wells and volume of ancillary fluids injected through one or more injector wells, 3) establishing maximum contact well, 4) stimulation of one or more existing producing wells to increase productivity, or 5) modifying one or more existing producing wells to decrease output; and
performing one or more of the following:
placing new producing oil wells in locations at the petroleum reservoir and constructing the new producing oil wells according to the plan of action;
placing injector wells in locations at the petroleum reservoir according to the plan of action in order to help drive oil in the reservoir toward the new producing oil wells and optionally toward pre-existing oil wells of the petroleum reservoir;
beginning to operate a maximum contact well at the petroleum reservoir having a primary well bore from which petroleum is removed and multiple well bore branches that extend laterally from the primary well bore, at least some of which well bore braches connecting to the primary well bore at different locations along the primary well bore;
stimulating one or more first producing wells at the petroleum reservoir to increase productivity of the first producing wells; or
modifying one or more second producing wells at the petroleum reservoir to decrease output of the second producing wells.

14. The method of implementing a plan of action as in claim 13, wherein performing asymmetric analysis of the petroleum reservoir to determine reservoir competency includes determining a reservoir management rating for the petroleum reservoir, the reservoir management rating being determined by asymmetrically weighting performance metrics relating to the following categories: reservoir management design, reserves appreciation, development and operating plan, reservoir surveillance, technology application, and knowledge management.

15. The method of assessing the competency of a petroleum reservoir as in claim 14, the performance metrics being weighted according to the following weighting criteria: reservoir management design≈reserves appreciation>development and operating plan>technology application>reservoir surveillance>knowledge management.

16. The method of implementing a plan of action as in claim 13, wherein performing asymmetric analysis and designing a plan of action are carried out at least in part by means of a computer system having a processor and system memory and displaying information relating to the petroleum reservoir.

17. The method of implementing a plan of action as in claim 13, the new producing oil wells being constructed so as to include one or more subsurface production control devices selected from the group consisting of down hole valves, down hole flow devices, impellers, choking devices, down hole submersible pumps, separation devices to pack or seal off a portion of the petroleum reservoir, and perforations in well pipe to increase reservoir contact area.

18. The method of implementing a plan of action as in claim 17, at least one of the new producing oil wells being constructed as a maximum reservoir contact well having a plurality of branched and at least partially horizontal well bores.

19. The method of implementing a plan of action as in claim 17, the new producing oil wells being constructed to as to include well pipe perforations, wherein the number and direction of the perforations are in accordance with the plan of action.

20. The method of implementing a plan of action as in claim 13, further comprising redesigning the interior of a pre-existing oil well in order to increase reservoir contact area and thereby increase well productivity.

21. The method of implementing a plan of action as in claim 13, wherein placement of the injector wells and the volume of ancillary fluids injected through the injectors are in accordance with the plan of action.

22. The method of implementing a plan of action as in claim 13, further comprising constructing and/or placing equipment for separating the ancillary fluids from petroleum extracted from the reservoir and processing the ancillary fluids.

23. The method of implementing a plan of action as in claim 13, further comprising stimulating one or more existing oil wells to increase productivity by at least one of high pressure fracking, acid fracking, or acid washing.

24. The method of implementing a plan of action as in claim 13, further comprising shutting down one or more pre-existing oil wells so as to alter flow of petroleum through the reservoir in a manner that ultimately drains more oil from the reservoir than if the pre-existing oil wells were not shut down.

25. The method of assessing the competency of a petroleum reservoir as in claim 13,
the at least one leading indicator being selected from the group consisting of dead well index, dead well gradient, gas oil ratio, gas oil ratio gradient, reservoir pressure change, oil decline rate, oil decline rate gradient, waterflood efficiency, waterflood efficiency gradient, water cut, water cut gradient, recovery deficiency indicator, and production gain index,
the at least one lagging indicator being selected from the group consisting of average producer liquid rates, oil rate, water rate, depletion rate, expected ultimate recovery depletion rate, 1P depletion rate, depletion state, expected ultimate recovery depletion state, mobile oil initially in place depletion state, dimensionless pressure drawdown, dimensionless productivity index, dimensionless injectivity index, gas rate, liquid rate, maximum efficient rate, oil rate, water rate, pressure gradient, productivity index gradient, rate restrictions, dimensionless rate restrictions, recovery efficiency, oil recovery factor, mobile oil depletion efficiency, theoretical maximum recovery efficiency, transmissibility index, voidage replacement ratio, surface voidage replacement ratio, and reservoir voidage replacement ratio.

26. A computer implemented method of monitoring and tracking performance of a petroleum reservoir relative to at least one of production or recovery, comprising:
taking or receiving measurements relating to oil well performance at a petroleum reservoir and inputting the measurements into a computer system having a processor and system memory;
the computer system relating the measurements to performance metrics, at least some of which are leading indicators and lagging indicators of oil well performance at the petroleum reservoir, the computer system weighting at least one leading indicating indicator more heavily than at least one lagging indicator;
the computer system comparing at least some of the measurements and/or performance metrics relating to oil well performance at the petroleum reservoir to predetermined alarm levels or triggers; and
upon a measurement or performance metric exceeding an alarm level or trigger point by falling below a minimum or exceeding a maximum, the computer system performing at least one of 1) altering at least one production parameter by an oil well at the petroleum reservoir or 2) alerting a reservoir manager, owner and/or third party that an alarm level or trigger point has been exceeded relative to the petroleum reservoir.

27. The computer implemented method of monitoring and tracking reservoir performance as in claim 26, the computer system further displaying information relating to at least one measurement and/or performance metric relating to oil well performance.

28. The computer implemented method of monitoring and tracking reservoir performance as in claim 27, the computer system displaying the information graphically and/or so as to appear as a dial.

29. The computer implemented method of monitoring and tracking reservoir performance as in claim 26, wherein exceeding an alarm level or trigger point results in at least one of increasing or reducing oil production by one or more oil wells of the reservoir.

30. The computer implemented method of monitoring and tracking reservoir performance as in claim 26, wherein exceeding an alarm level or trigger point results in at least one of increasing or reducing oil production by putting one or more new oil wells into production at the reservoir or stopping production by one or more oil wells.

31. The computer implemented method of monitoring and tracking reservoir performance as in claim 26, wherein exceeding an alarm level or trigger point results in at least one of increasing or reducing ancillary fluid injection into the reservoir.

32. The computer implemented method of monitoring and tracking reservoir performance as in claim 26, wherein exceeding an alarm level or trigger point results in stimulation of at least one oil well to increase well productivity.

33. A method of assessing the competency of a petroleum reservoir relative to production and recovery for purposes of initiating a plan of action to increase production and/or recovery, comprising:
establishing a plurality of reservoir performance metrics that relate to the production and recovery of petroleum from the reservoir;
weighting one or more of the reservoir performance metrics more heavily than at least one other of the reservoir performance metrics to facilitate asymmetric analysis of the reservoir performance metrics;
obtaining data relating to the reservoir performance metrics, the data being generated by at least one of (i) measuring a physical property of one or more producing oil wells and/or injector wells of the reservoir, (ii) taking and analyzing one or more core samples from the reservoir, or (iii) establishing a relationship between one or more different types of data from (i) or (ii);
generating the reservoir performance metrics from the data; and
determining a competency rating for the petroleum reservoir relating to at least one of production or recovery of petroleum from the petroleum reservoir, the competency rating being based at least in part on a reservoir management rating for the petroleum reservoir,
the reservoir management rating being determined by asymmetrically weighting performance metrics relating to the following categories: reservoir management design, reserves appreciation, development and operating plan, reservoir surveillance, technology application, and knowledge management,
the performance metrics relating to reservoir management design including recovery design, field depletion rate, well rate/drawdown, displacement process risk, and plateau sustainability,
the performance metrics relating to reserves appreciation including oil OIIP/GIIP verification, sweep efficiency, displacement efficiency, reserves verification, and risk mitigation,
the performance metrics relating to development and operating plan including production plan achievement, field productivity, pressure management, gas management, water management, and drawdown management,
the performance metrics relating to reservoir surveillance including master plan design and master plan implementation,
the performance metrics relating to technology application including drilling technology, completion technology, stimulation technology, and reservoir dynamics technology, and
the performance metric relating to knowledge management including knowledge management index.

34. A method of assessing the competency of a petroleum reservoir relative to production and recovery for purposes of initiating a plan of action to increase production and/or recovery, comprising:
- establishing a plurality of reservoir performance metrics that relate to the production and recovery of petroleum from the reservoir;
- weighting one or more of the reservoir performance metrics more heavily than at least one other of the reservoir performance metrics to facilitate asymmetric analysis of the reservoir performance metrics;
- obtaining data relating to the reservoir performance metrics, the data being generated by at least one of (i) measuring a physical property of one or more producing oil wells and/or injector wells of the reservoir, (ii) taking and analyzing one or more core samples from the reservoir, or (iii) establishing a relationship between one or more different types of data from (i) or (ii);
- generating the reservoir performance metrics from the data; and
- determining a competency rating for the petroleum reservoir relating to at least one of production or recovery of petroleum from the petroleum reservoir, the competency rating being based at least in part on a reservoir management rating for the petroleum reservoir,
- the reservoir management rating being determined by asymmetrically weighting performance metrics relating to the following categories: reservoir management design, reserves appreciation, development and operating plan, reservoir surveillance, technology application, and knowledge management, wherein the reservoir management design and the reserves appreciation are weighted more heavily than the development and operating plan, the technology application, the reservoir surveillance, and the knowledge management.

35. The method of assessing the competency of a petroleum reservoir as in claim 34, wherein the development and operating plan is weighted more heavily than the technology application, which is weighted more heavily than the reservoir surveillance, which is weighted more heavily than the knowledge management.

* * * * *

UNITED STATES PATENT AND TRADEMARK OFFICE
CERTIFICATE OF CORRECTION

PATENT NO.        : 7,963,327 B1
APPLICATION NO.   : 12/392891
DATED             : June 21, 2011
INVENTOR(S)       : Saleri et al.

It is certified that error appears in the above-identified patent and that said Letters Patent is hereby corrected as shown below:

Column 3
Line 10, change "prouction" to --production--
Line 61, change "locations.""" to --locations.--

Column 4
Line 46, change "gather" to --gathered--

Column 6
Line 41, change "well" to --wells--

Column 7
Line 9, change "remove computers" to --remote computers--

Column 17
Line 6, change "tenets been" to --tenets have been--
Line 9, change "other" to --other.--

Column 19
Line 40, change "been validated" to --have been validated--
Line 41, change "reserves been identified" to --reserves have been identified--
Line 42, change "plans been prepared" to --plans have been prepared--
Line 44, change "other" to --other.--

Column 21
Line 45, in Table 13, change "incorporate" to --incorporated--
Line 51, change "increases" to --increased--
Line 60, change "other" to --other.--

Signed and Sealed this
Fourteenth Day of February, 2012

David J. Kappos
*Director of the United States Patent and Trademark Office*

Column 23
Line 37, change "other" to --other.--
Line 56, in Table 17, change "sreservoir" to --reservoir--

Column 24
Line 35, change "issue are" to --issues are--

Column 25
Line 63, change "issue are" to --issues are--

Column 27
Line 14, change "defined as" to --defined as:--
Line 62, change "RDI" to --PGI--

Column 30
Line 9, change "asses" to --assess--

Column 34
Line 46, change "Centrifuge know tests" to --Centrifuge krow tests--
Line 56, change "Centrifuge hog tests" to --Centrifuge krog tests--

Column 35
Line 9, change "ability knowledgably" to --ability to knowledgably--

Column 37
Line 35, change "asses" to --assess--
Line 62, change "develop of a rating" to --develop a rating--

Column 39
Line 61, change "constructed to as" to --constructed so as--

Column 43
Line 22, change "1:" to --1)--

Column 46
Line 63, change "forcast" to --forecast--

Column 47
Line 62, change "braches" to --branches--

Column 48
Line 41, change "constructed to as" to --constructed so as--